(12) United States Patent
Notani

(10) Patent No.: US 6,850,660 B2
(45) Date of Patent: Feb. 1, 2005

(54) TRANSMISSION APPARATUS

(75) Inventor: Morihito Notani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 10/459,390

(22) Filed: Jun. 9, 2003

(65) Prior Publication Data

US 2003/0228093 A1 Dec. 11, 2003

(30) Foreign Application Priority Data

Jun. 10, 2002 (JP) ........................................ 2002-169136

(51) Int. Cl.[7] .............................................. H04J 14/02
(52) U.S. Cl. ............................ 385/16; 385/24; 398/45; 398/50; 398/79; 370/222; 370/223; 370/380
(58) Field of Search ............................ 383/14, 15, 16, 383/24; 398/19, 45, 50–51, 59, 68, 70–71, 79; 370/222, 223, 224, 358, 359, 380, 404, 509, 539, 541

(56) References Cited

U.S. PATENT DOCUMENTS

| | | | |
|---|---|---|---|
| 2003/0123493 A1 * | 7/2003 | Takahashi | 370/539 |
| 2003/0128911 A1 * | 7/2003 | Ravikanth et al. | 385/16 |
| 2003/0215231 A1 * | 11/2003 | Weston-Dawkes et al. | 398/19 |
| 2003/0228147 A1 * | 12/2003 | Brahim | 398/50 |
| 2004/0028406 A1 * | 2/2004 | Bortz et al. | 398/49 |
| 2004/0161235 A1 * | 8/2004 | Halgren et al. | 398/45 |

OTHER PUBLICATIONS

"High Performance Gigabit Switch Router for Service Providers and Large Sized Corporate IP Backbones" Cisco 1200 Series.

"Routing Technologies for Ultra–High–Speed Networks" Horita, IEICE, vol. 84, No. 7, pp. 471–477, Jul. 2001.

* cited by examiner

Primary Examiner—John R. Lee
Assistant Examiner—David A. Vanore
(74) Attorney, Agent, or Firm—Katten Muchin Zavis Rosenman

(57) ABSTRACT

A transmission apparatus for coupling an optical signal transmission section and an electrical signal transmission section through an opto-electric two-way conversion unit, where the electrical signal transmission section is comprised of a SONET/SDH signal processing function unit and a generalized multi protocol label switching (GMPLS) function processing function unit cooperating with that function unit and where the optical signal transmission section is comprised of an optical add/drop function unit for transferring an optical signal with the electrical signal transmission section through the conversion unit and an optical cross-connect function unit for switching paths in wavelength units of the optical signal with the electrical signal transmission section, whereby the capital cost and running costs of an optical network for transmitting an IP signal can be greatly reduced.

10 Claims, 24 Drawing Sheets

FIG. 3

| #1 | #2 | #3 | #12 | #1 | #2 | #3 | #12 | #1 | #2 | #3 | #12 | | | | | | | |
|---|---|---|---|---|---|---|---|---|---|---|---|---|---|---|---|---|---|---|
| A1 | A1 | A1 | A1 | A2 | A2 | A2 | A2 | – | – | – | – | – | – | – | – | – | – | – |
| B1 | – | – | – | E1 | – | – | – | – | – | – | – | – | – | – | – | – | – | – |
| – | – | – | – | – | – | – | – | – | – | – | – | – | – | – | – | – | – | – |
| H1 | H1 | H1 | H1 | H2 | H2 | H2 | H2 | H3 | H3 | H3 | H3 | – | – | – | – | – | – | – |
| – | – | – | – | – | – | – | – | – | – | – | – | – | – | – | – | – | – | – |
| – | – | – | – | – | – | – | – | – | – | – | – | – | – | – | – | – | – | – |
| – | – | – | – | – | – | – | – | – | – | – | – | – | – | – | – | – | – | – |
| – | – | – | – | – | – | – | – | – | – | – | – | – | – | – | – | – | – | – |
| – | – | – | – | – | – | – | – | – | – | – | – | – | – | – | – | – | – | – |

☐ : ALL 0

FIG. 4

| BYTE NAME | CONTENTS |
|---|---|
| A1 | "11110110"(0xf6) |
| A2 | "00101000"(0x28) |
| B1 | PARITY BIT (AS IN USUAL STS FRAME) |
| E1 | CONCATENATION INFORMATION |
| H1 | BYTES RELATING TO POINTER |
| H2 | |
| H3 | |

FIG.5

| ASSIGNED | CONTENTS | CONDITION |
|---|---|---|
| BIT 1 | UNUSED BITS | 0 |
| BIT 2 | STS-48 STATUS | 1:CONCATENATION |
| BIT 3 | STS-24 STATUS | 1:CONCATENATION |
| BIT 4 | STS-12 STATUS | 1:CONCATENATION |
| BIT 5 | STS-3#4 STATUS | 1:CONCATENATION |
| BIT 6 | STS-3#3 STATUS | 1:CONCATENATION |
| BIT 7 | STS-3#2 STATUS | 1:CONCATENATION |
| BIT 8 | STS-3#1 STATUS | 1:CONCATENATION |

MSB:BIT 1

ROUTER A  ROUTER B

ROUTER C  NE1  ROUTER D

FIG.12
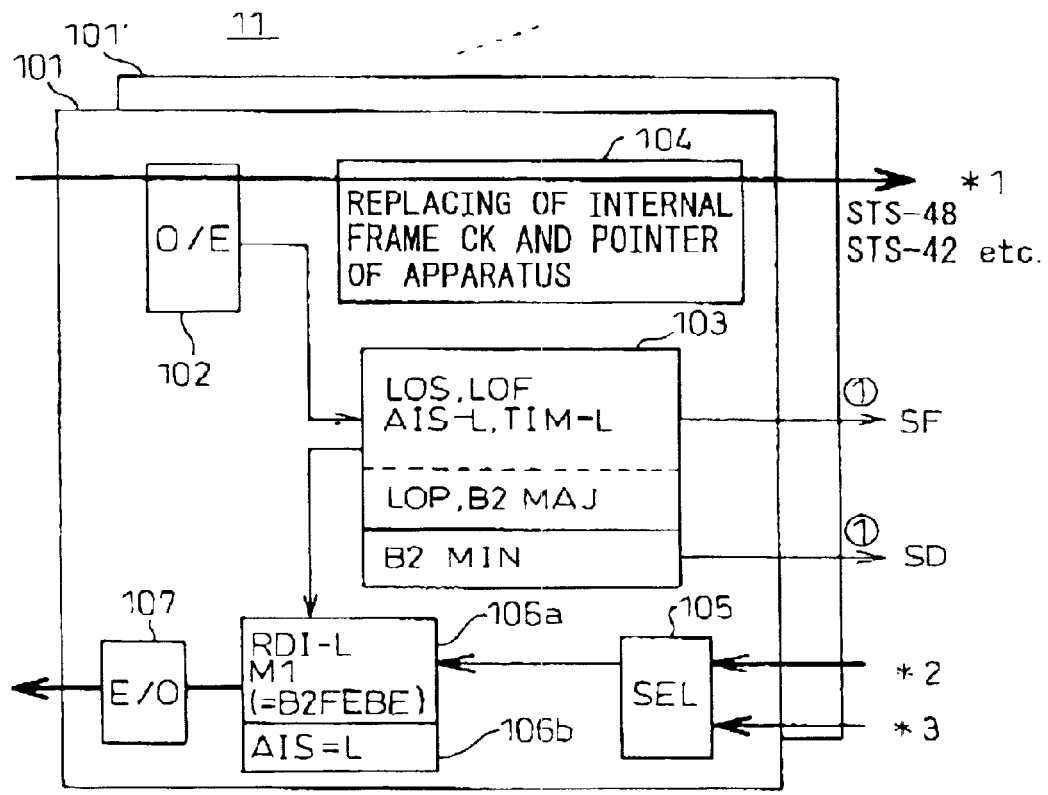
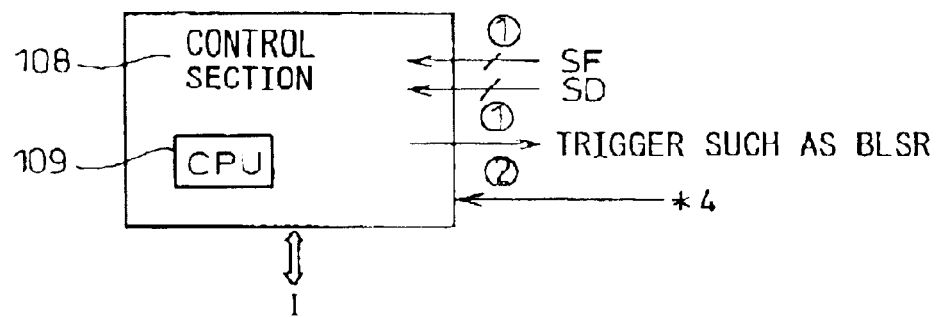

TRANSMISSION APPARATUS

BACKGROUND OF THE INVENTION

1. Field of the Invention

The present invention relates to a transmission apparatus, more particularly relates to a transmission apparatus provided with a synchronous optical network/synchronous digital hierarchy (SONET/SDH), wavelength division multiplexing (WDM), or other interface As such transmission apparatuses, in general, there are add-drop multiplexer (ADM) apparatuses, cross-connect apparatuses, optical ADM (OADM) apparatuses, optical cross-connect (OXC) apparatuses, etc. Further, in the present invention, the transmission apparatuses include transmission apparatuses for adding/dropping, cross-connecting, or switching plesiochronous digital hierarchy (PDH) signals, asynchronous transfer mode (ATM) signals, and Ethernet signals. Further, the present invention may also include all sorts of transmission apparatuses (communication apparatuses) for transmitting Internet protocol (IP) signals

2. Description of the Related Art

Conventional SONET/SDH transmission apparatuses manage networks, including ring switching at the time of occurrence of line faults, at only the SONET/SDH layers by monitoring, terminating, and adding overhead of SONET/SDH frames.

WDM transmission apparatuses also manage networks at only the WDM layers.

Further, IP transmission apparatuses manage networks only between routers switching the IP signals, that is, only between one router and another. In other words, they can only manage networks at the transmission control protocol/IP (TCP/IP) layers.

In recent years, in view of all of this, various integrated network management techniques have been proposed with the intention of integrally managing IP networks and optical networks. These integrated network management techniques will be explained in detail later with reference to the drawings.

As will become evident later, however, in the past, no technique has been proposed enabling entire networks to be integrally managed by having single transmission apparatuses perform processing for the SONET/SDH/WDM layers and the TCP/IP layers. In the final analysis, there has therefore been the problem that it has not been possible to greatly reduce the capital costs and running costs of an optical network for transmitting IP signals.

SUMMARY OF THE INVENTION

An object of the present invention is, in view of the above problem, to provide a transmission apparatus able to greatly reduce the capital costs and running costs of an optical network for transmitting IP signals.

To attain the above object, there is provided a transmission apparatus (1) for coupling an optical signal transmission section (2) and an electrical signal transmission section (4) through an opto-electric two-way conversion unit (3), where the electrical signal transmission section (4) is comprised of a SONET/SDH signal processing function unit (5) and a generalized multi protocol label switching (GMPLS) function processing function unit (6) cooperating with that function unit (5) and where the optical signal transmission section (2) is comprised of an optical add/drop function unit (7) for transferring an optical signal with the electrical signal transmission section (4) through tho conversion unit (3) and an optical cross-connect function unit (8) for switching paths in wavelength units of the optical signal with the electrical signal transmission section (4)

BRIEF DESCRIPTION OF THE DRAWINGS

These and other objects and features of the present invention will become clearer from the following description of the preferred embodiments given with reference to the attached drawings, wherein:

FIG. 3 is a view of a known example of an overhead configuration based on STS-12;

FIG. 4 is a view of a known example of an overhead information based on STS-12;

FIG. 5 is a view of a known example of concatenation information of an EI byte based on STS-12;

FIG. 9(a) is a view of an example of a conventional network configuration, while

FIG. 12 is a first part of a view of a detailed example of the main parts of an electrical signal transmission section;

DESCRIPTION OF THE PREFERRED EMBODIMENTS

Preferred embodiments of the present invention will be described in detail below while referring to the attached figures.

Figure 1A:
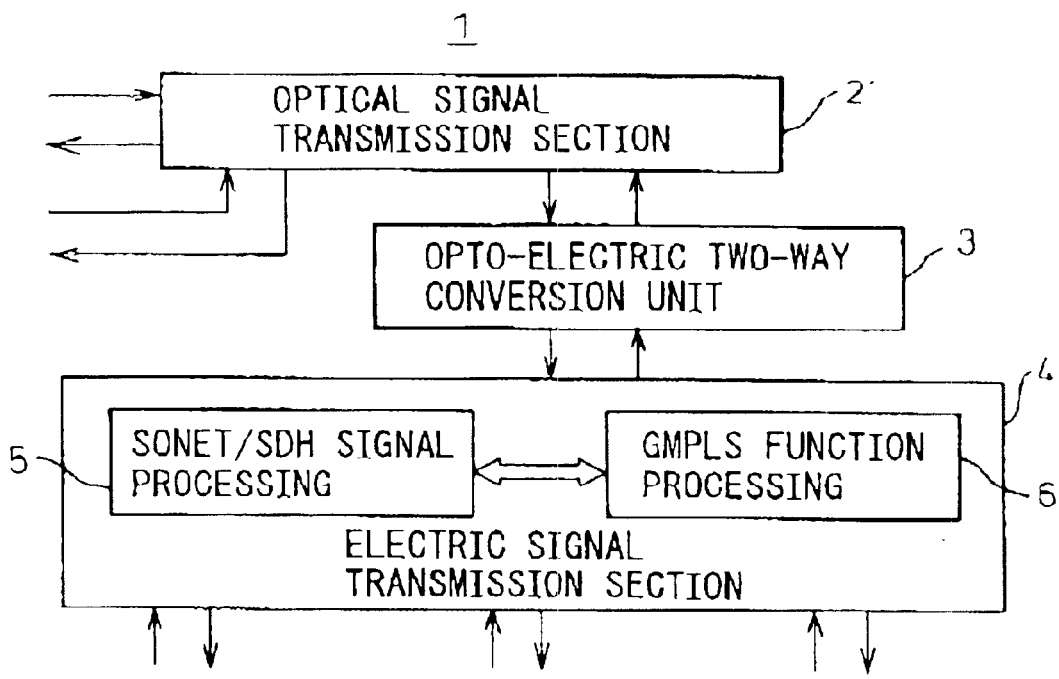
FIGS. 1(a) and 1(b) are views of first and second basic configurations of a transmission apparatus according to the present invention.
Figure 1B:
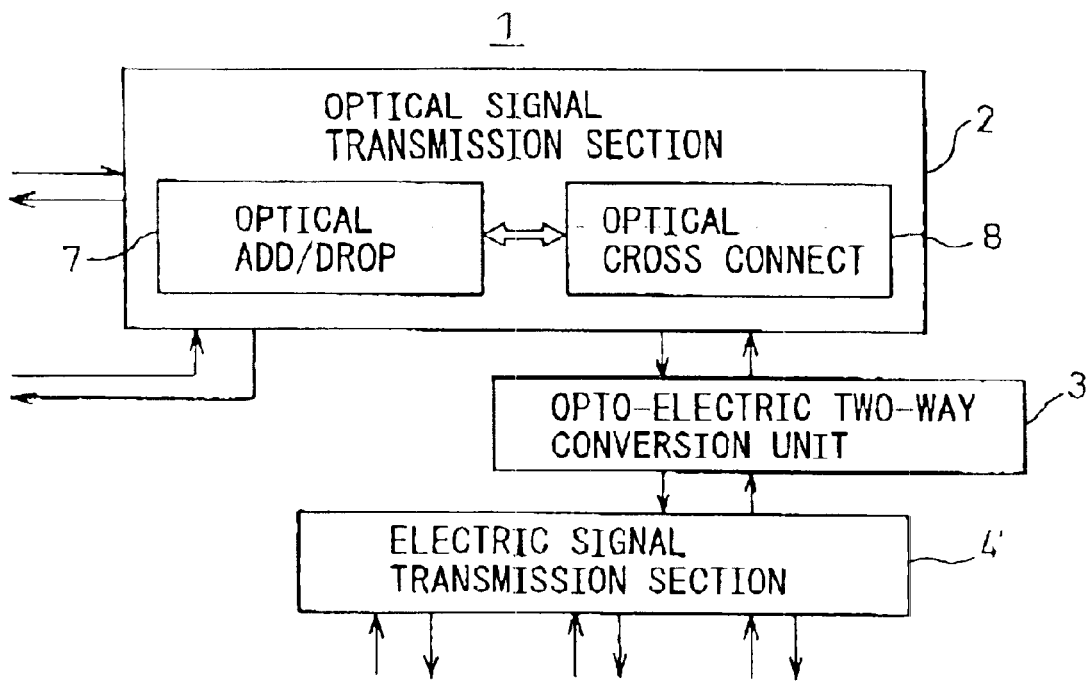

FIGS. 1(a) and 1(b) are views of a first and second basic configuration of a transmission apparatus according to the present invention.

First, looking at the transmission apparatus of the first basic configuration of FIG. 1(a), the transmission apparatus 1 is a transmission apparatus coupling an optical signal transmission section 2' and an electrical signal transmission section 4 through an opto-electric two-way conversion unit 3. Here, the electrical signal transmission section 4 is comprised of a SONET/SDH signal processing function unit 5 and a GMPLS function processing function unit 6 cooperating with the SONET/SDH signal processing function unit 5.

Note that optical signal transmission section 2' is preferably configured such as shown by the optical signal transmission section 2 of FIG. 1(b), but the invention is not limited to this configuration.

Next, looking at the transmission apparatus 1 according to the second basic configuration of FIG. 1(b), the optical signal transmission section 2 is comprised of an optical add/drop function unit 7 for transferring an optical signal with an electrical signal transmission section 4' through an opto-electric two-way conversion unit 3 on the one hand and an optical cross-connect function unit 8 for switching paths in wavelength units of the optical signal with the electrical signal transmission section 4' through the opto-electric two-way conversion unit 3 on the other hand.

Note that the electrical signal transmission section 4' is preferably configured as in the electrical signal transmission section 4 shown in FIG. 1(a), but the invention is not limited to this configuration. The following explanation, however, will be given taking as an example a configuration using the optical signal transmission section 2 of FIG. 1(b) as the optical signal transmission section 2' of FIG. 1(a). Due to this configuration, it becomes possible for a single transmission apparatus 1 to perform processing at the SONET/SDH/WDM layer and TCP/IP layer and thereby realize a low cost multi service network. A specific example of this configuration will be explained below.

Before explaining preferred embodiments of the present invention, the known art will be explained, then the concept of the present invention will be described compared against this known art.

As explained above, conventional SONET/SDH transmission apparatuses manage networks, including ring switching at the time of a line fault, only at the SONET/SDH layers by monitoring, terminating, and adding overhead of the SONET/EDH frames. Further, WDM transmission apparatuses manage networks only at the WDM layers. Further, IP transmission apparatuses can manage networks only between routers switching IP signals, that is, at the TCP/IP layers.

Therefore, in recent years, for the purpose of integrally managing IP networks and optical networks, the Internet Engineering Task Force (IETF), a forum for standardization of the Internet, has been discussing standardization of an expanded version of the MPLS, that is, the GMFLS. Further, the Optical Internet Working Forum (OIF), an industrial organization concerned with optical interfaces, has been discussing standardization of optical user network interfaces (O-UNI's) simplifying the GMPLS.

The latter, however, is only a standard for when, like with an O-UNI, interfacing between an optical cross-connect apparatus (OXC apparatus), that is, an apparatus having a WDM interface and having the function of being able to switch a signal of one wavelength to a signal of another wavelength, and a router or other type of communication apparatus (for example, see http://www4.nikkeibp.co.jp/NCC/news/ncc2319.htm) Note that an O-UNI corresponds to one called as an "overlay model". This is shown in the drawings.

Figure 22:
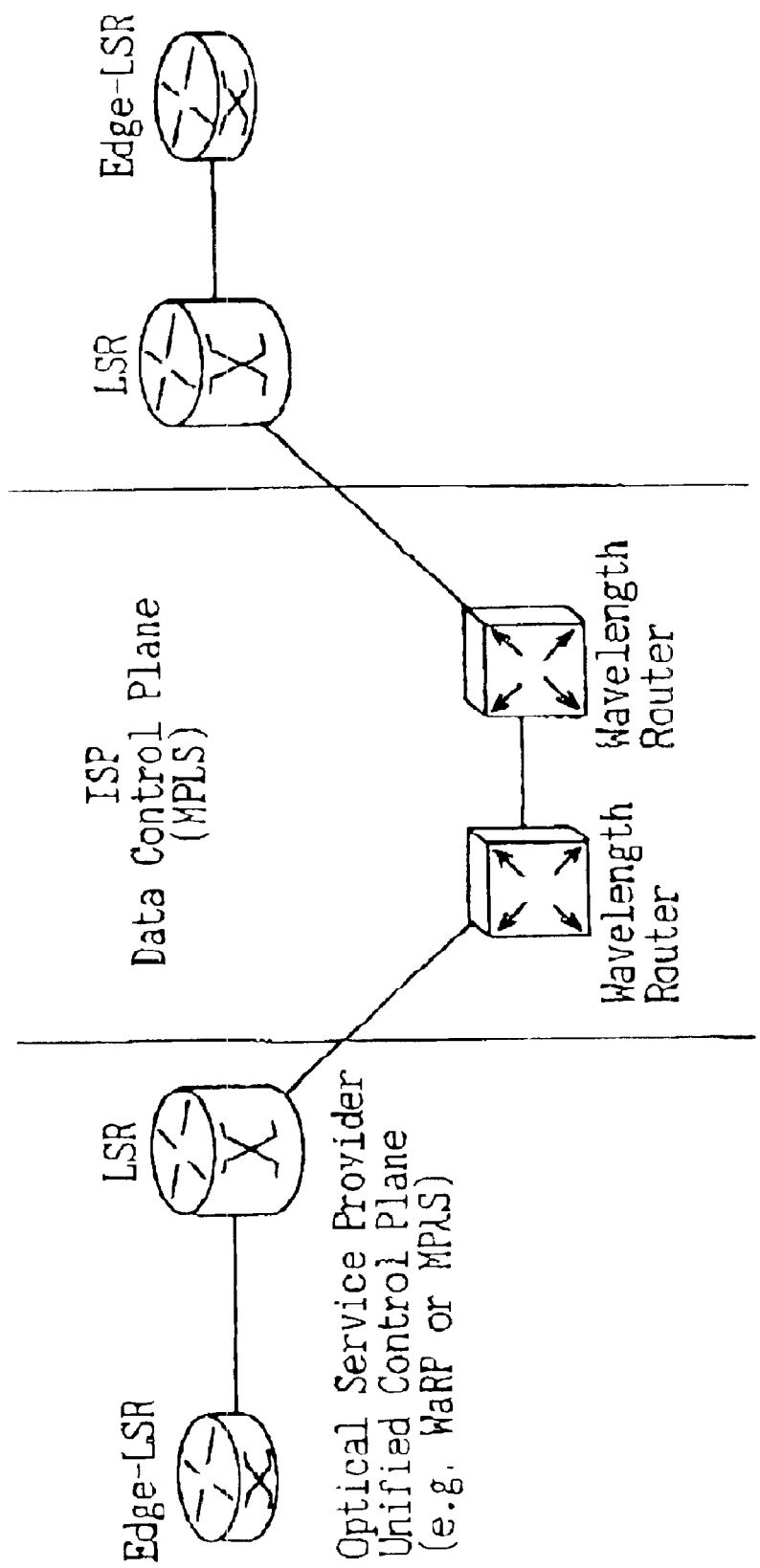
FIG. 22 is a view of an example of a known overlay model.

FIG. 22 is a view of an example of a known overlay model. In the figure, "LSR" indicates a label switching router.

The truth is, however, that an O-UNI or overlay model does not achieve the object of truly integrated network management.

Even models or apparatuses supposedly leading the way in standardization of GMPLS are in the final analysis merely proposals on the level of LSR's based on the MPLS (for example, the draft:mpls-generalized- . . . of the IETF published), configurations called PIA models, LSR hardware configurations, etc. This is shown in the drawings.

Figure 23:
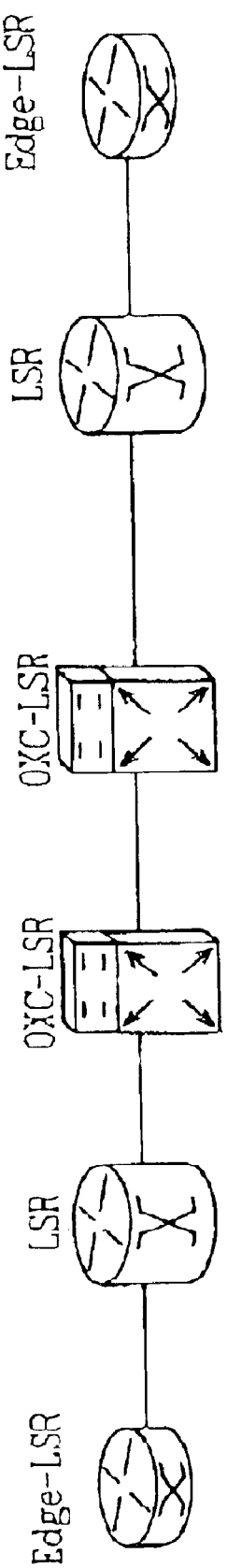
FIG. 23 is a view of an example of a PIA model as a future model currently being proposed.
Figure 24:
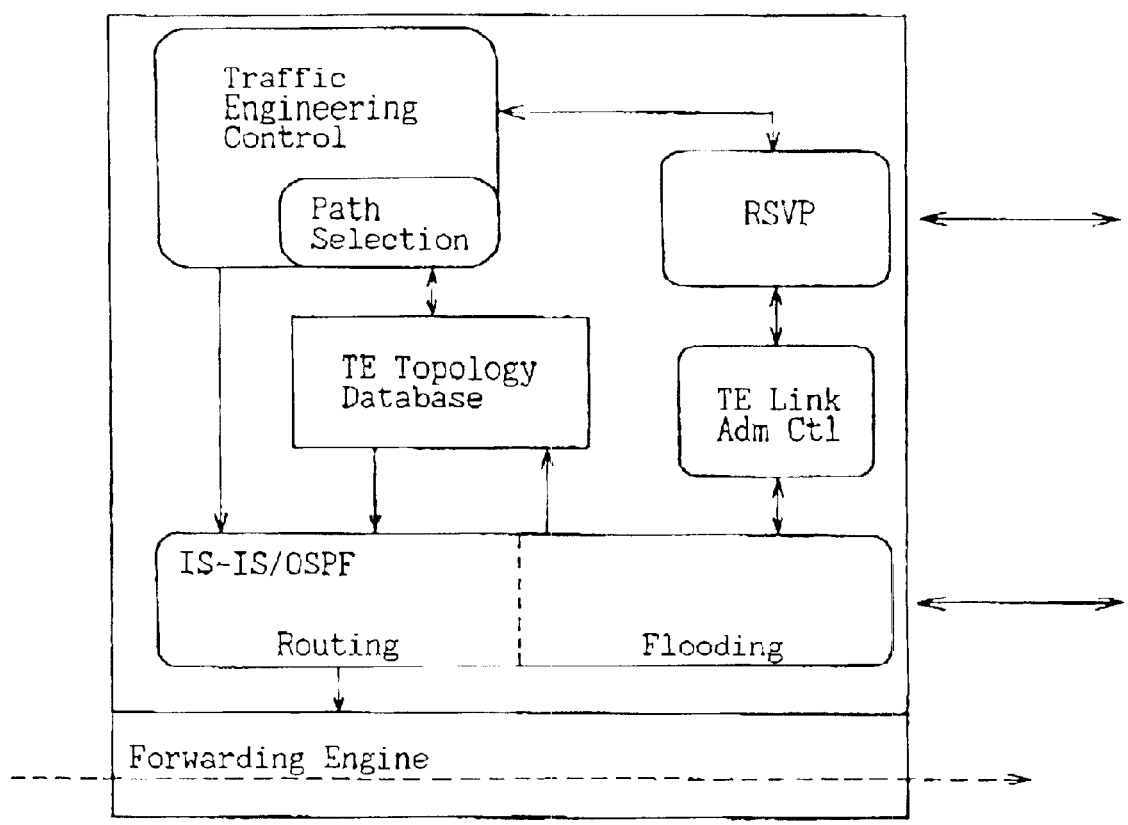
FIG. 24 is a view of an example of a label switching router (LSR) hardware configuration currently proposed.

FIG. 23 is a view of an example of a PIA model as a future model currently being proposed, while FIG. 24 is a view of an example of an LSR hardware configuration currently proposed.

Note that the LSR shown in FIG. 24 is an LSR based on the concept of Cisco Systems Inc. In the figure, "TE" means "Traffic Engineering" and "RSVP" means "Resource Reservation Protocol". RSVP is the protocol for executing control over the quality of service (QoS) etc. when communicating between two points through the Internet. The LSR of FIG. 24 will be explained further later, but according to this LSR, the network is centrally managed at a TE topology database in the figure, so the load on this database ends up becoming considerably high.

Further, current proposals are only for hardware at the pure light level layer in optical cross-connection (OXC) (for example, see http://www4.nikkeibp.co.jp/NCC/news/ncc2318.htm) or only abstract future plans relating to networks (for example, see http://www.nortelnetworks.com/corporate/technology/mpls/ index.htm and the various white papers of Nortel Networks Ltd. linked to this).

Further, if trying to complicatedly manage a network by pure light type network nodes as proposed by Nortel, it would be necessary to install optical detectors throughout the optical paths to monitor the state of the optical signals. This would conversely invite an increase in the cost of the hardware.

Further, in recent years, NTT of Japan and village Networks Inc. of the U.S. have announced OXC/LSR integrated apparatuses purported to be compatible with GMPLS (for example, see http://www4.nikkeibp.co.jp/NCC/news/ncc2325.htm). However, these only simply integrate OXC apparatuses and LSR's of the MPLS. The labeled IP paths are believed to only be handled by the LSR'S such as shown in the above FIG. 24. For example, these do not touch at all on what kind of cooperation is possible between the setup for automatic bypassing of faults at the SONET/SDH layer and path management of the IP label when a fault occurs in a SONET/SDH network. The reason is that the apparatuses of NTT and Village Networks Inc. are not provided with interface functions or cross connect functions at the SONET/SDH layer.

Further, each of the above apparatuses and concepts proposed as PEER models for GMPLS fundamentally have the following disadvantage.

That is, global telecommunication carriers have deployed considerable numbers of existing WDM apparatuses, SONET/SDH ADM/cross connect apparatuses, and ATM nodes (NE (network elements)). If trying to introduce OXC having such special LSR functions, there is the disadvantage that this existing equipment would have to be replaced. This however would force a considerable cost burden on the telecommunication carriers.

Therefore, there would be great merit if it were possible to achieve the object of integrated network management by just partially adding functions to existing hardware. No such hardware concept however has yet been proposed anywhere.

Further, it would be extremely effective if it were possible to achieve the above object by upgrading SONET/SDH apparatuses, existing WDM apparatuses not having OXC functions, or optical add/drop multiplexers (OADM) as they are. No such hardware, however, has been proposed anywhere either.

If considering making effective use of existing hardware, the O-UNI (overlay model) explained at the start would be effective. This model, however, establishes a protocol completely occupying a certain wavelength at the entrance to the WDM network, so does not allow the IP MPLS paths to be freely controlled or faults to be bypassed at the WDM network. Therefore, the above object cannot be achieved.

Here, if selecting a previously proposed hardware configuration believed closest to the basic configuration shown in FIG. 1 according to the present invention, the result would be the configuration shown in FIG. 24. This figure shows the configuration of an LSR contemplating integrated network management.

If using hardware having the features of this configuration, the topology information of the optical network can be recognized even at the LSR side, so network management at the LSR side would appear to be possible. This, however, just proposes enabling a router manager to indirectly manage the optical network as well. Conversely, if the side managing the SONET/SDH network or WDM network could efficiently extract and manage MPLS path information, the object of integrated network management should be able to be achieved by that alone. This type of proposal, however, is not made. In this case, if managing the network from the standpoint of managing LSR's, unless adding the functions of LSR's to all of the nodes (NE) of the optical network, integrated network management cannot be achieved. Therefore, since it would be necessary to add LSR's to all nodes in order to achieve this object, as explained above, it would be necessary to replace the existing SONET/SDH/WDM resources and accordingly there would be little merit to the telecommunication carriers.

Further, when a fault occurs at the WDM layer or the SONET/SDH layer, if trying to collect fault information and process it at an LSR and then automatically switch lines to deal with the fault, a question remains whether this processing could really be done in a short time of within 50 ms as with existing SONET/SDH apparatuses.

The concept of the present invention will be explained next while considering the above as background.

Due to the explosive increase in IP's, the percentage of IP's in total communication traffic has been rising. In backbone networks, including metro networks, optical communication networks have become the mainstream. The present invention, however, is explained with reference to a configuration where a photonic network such as a SONET/SDH or WDM/OADM network forms the core of the network.

In the past, the TCP/IP layer and the SONET/SDH/WDM layer were separately managed independently of each other using their own hardware.

In terms of economizing on the cost of the equipment for forming the network or the costs of running the network as well, however, it would be more advantageous to handle both layers integrally and manage the network as a whole.

with this idea in mind, the IETF has also discussed standardization of the GMPLS. The present invention however specifically proposes a configuration for managing an overall IP and SONET/SDH/WDM/OADM network by a manner different from that previously proposed. Further, it aims at the effect of utilizing to the maximum the existing network resources and hardware resources of the telecommunication carriers.

In particular, the transmission apparatus of the present invention is a transmission apparatus stressing the way of setting the paths for the existing SONET/SDH network and WDM network, the way of bypassing line faults, and how well cooperation for processing is possible with similar processing at the IP path (MPLS path) level.

Further, it is possible to process transmission by providing not only SONET/SDH and WDM functions, but also an interface for existing fixed length ATM cells, an interface for the gigabit Ethernet, and an interface for the more advanced 10 Gb Ethernet. Therefore, the present invention proposes an economical apparatus enabling multiple services to be realized by a single node (NE). Due to this, next generation multi service SONET/SDH or multi service compatible WDM apparatuses (photonic apparatuses) become realistic.

Further, the IETF has been discussing non-ATM based signaling for the GMPLS. The present invention can realize a network configuration having merits similar to a GMPLS label path even using a cell obtained by extending the ATM cell length.

Further, the above-explained O-UNI of FIG. 22 (overlay model) is not sufficient for managing a network as a whole. Therefore, SONET/SDH/WDM nodes (NE) also have to be provided with setups for cooperating with MPLS paths. The present invention specifically provides a setup for setting paths at the SONET/SDH/WDM layer and automatic restoration of line faults (for example, ring protection) and a setup for efficient cooperation of the path setting at the MPLS layer with network management at the paths of the MPLS layer from the standpoint more of network management of SONET/SDH/WDM nodes (NE) than the standpoint of LSR managers as already proposed. Therefore, it specifically provides the configuration required by SONET/SDH/WDH nodes (NE's).

Further, it provides a function unit for making good use of existing SONET/SDH/WDM resources of telecommunication carriers and adding only partial functions, for example, replacing some card slots and adding cards to empty slots.

Further, next generation apparatuses (new nodes) provided with conventional SONET/SDH/WDM network, PDH, ATM, Ethernet, LAN/WAN, and other interfaces also become possible by the present invention. Introduction of such new nodes (NE) is advantageous when later increasing lines to meet with growing telecommunications volume and demand. Alternatively, this would also be advantageous when adding or dropping into a SONET/SDH network signals of a 10 Gb or higher Ethernet or new specification Ethernet provided with automatic line fault protection functions such as a ring protection, not exist so far.

Behind the proposal of these new nodes (NE) naturally has been the increase in traffic of IP's etc. accompanying the full-time connection of users and the increase in the daily volume of communications. On top of this has also been their envisioned use as part of the infrastructure for providing users with broadband environments at a low cost.

Referring again to the PEER model shown in FIG. 23, this PEER model employs oxc apparatuses predicated on a pure light network not converting the primary signals transmitted to electrical signals for processing. Further, there are proposals aiming at GMPLS in these OXC apparatuses. With such a pure light network, a superlarge capacity core network of a total transmission capacity over the Tbps level may be reasonable as one of the above proposals.

However, leaving aside just switching entire wavelengths, efficiently controlling the MPLS path level independently and efficiently allocating traffic to the non-used time division multiplex (TDM) regions are extremely difficult techniques. To realize this, it would be necessary to provide detectors for detecting the state of the light all around the place, provide optical memories, which still cannot be said to be sufficiently at the practical stage, in the optical paths of the apparatuses, or use sophisticated technology thereby making the apparatuses much higher in cost. This is not good for the telecommunication carriers and in turn for the users.

Therefore, the present invention takes into consideration the tradeoff between the types of communication processing in an apparatus, that is, electrical processing and optical processing, and provides a low cost transmission apparatus accordingly.

Further, it specifically proposes a method of cooperation and division of functions between an automatic fault bypassing function unit for dealing with line faults at the WDM (photonic) layer and a fault bypassing function unit at the MPLS path layer.

Further, if relying on the conventional thinking, use of OXC apparatuses provided with new functions would be required. However, some of the network nodes (WDM nodes) handling the WDM network layer do not have wavelength exchanging OXC functions and only have the function of bundling optical signals (WDM functions in the narrow sense) or adding/dropping optical signals (OADM). (There are also functions such as optical amplification or standardization of optical intensities of different wavelengths at the time of WDM, but these are not inherent to the present invention.)

Telecommunication carriers already have large numbers of such WDM nodes (NE). As explained above, however, if assuming the provision of OXC functions, integrated network management would become impossible to realize unless replacing these WDM nodes with photonic nodes (NE) with OXC apparatuses. This would similarly not only force a large investment burden on the telecommunication carriers, but would also not be of any merit to the users.

Therefore, the present invention realizes GMPLS integrated network management by just the partial addition of functions even without providing wavelength exchange functions like OXC functions and enables the realization of bypassing of line faults at the WDM layer, bypassing of line faults at the MPLS paths, and path setting for the same.

Some apparatuses proposed in the past were integrated OXC and LSR apparatuses, but as explained above these could not perform functions required in WDM network management such as cooperation in bypassing of line faults at the SONET/SDH layer and bypassing of line faults at the MPLS paths or setting of paths at the SONET/SDH layer in accordance with MPLS paths.

As opposed to this, the present invention realizes a specific hardware configuration enabling such WDM network management.

Further, the later explained embodiments propose SONET/SDH nodes and WDM nodes enabling ATM, Ethernet, PDH, and LAN/WAN multi services.

Non-OXC low cost integrated WDM/OADM and SONET/SDH multi service nodes are also shown in the embodiments.

Finally, referring again to FIG. 24, opposite to the above OXC based apparatus, an LSR apparatus for overall network management including an optical network is shown in FIG. 24 as the prior art closest to the present invention.

The present invention eliminated the disadvantage of the LSR shown in FIG. 24 of imposing too large a load on the LSR, proposes a transmission apparatus realizing high speed automatic line switching at a lost cost, and thereby enables effective utilization of existing network resources.

Above, the concept of the present invention was explained in comparison with the known art. Next, embodiments showing this concept in more detail will be explained.

Embodiments

Figure 2:
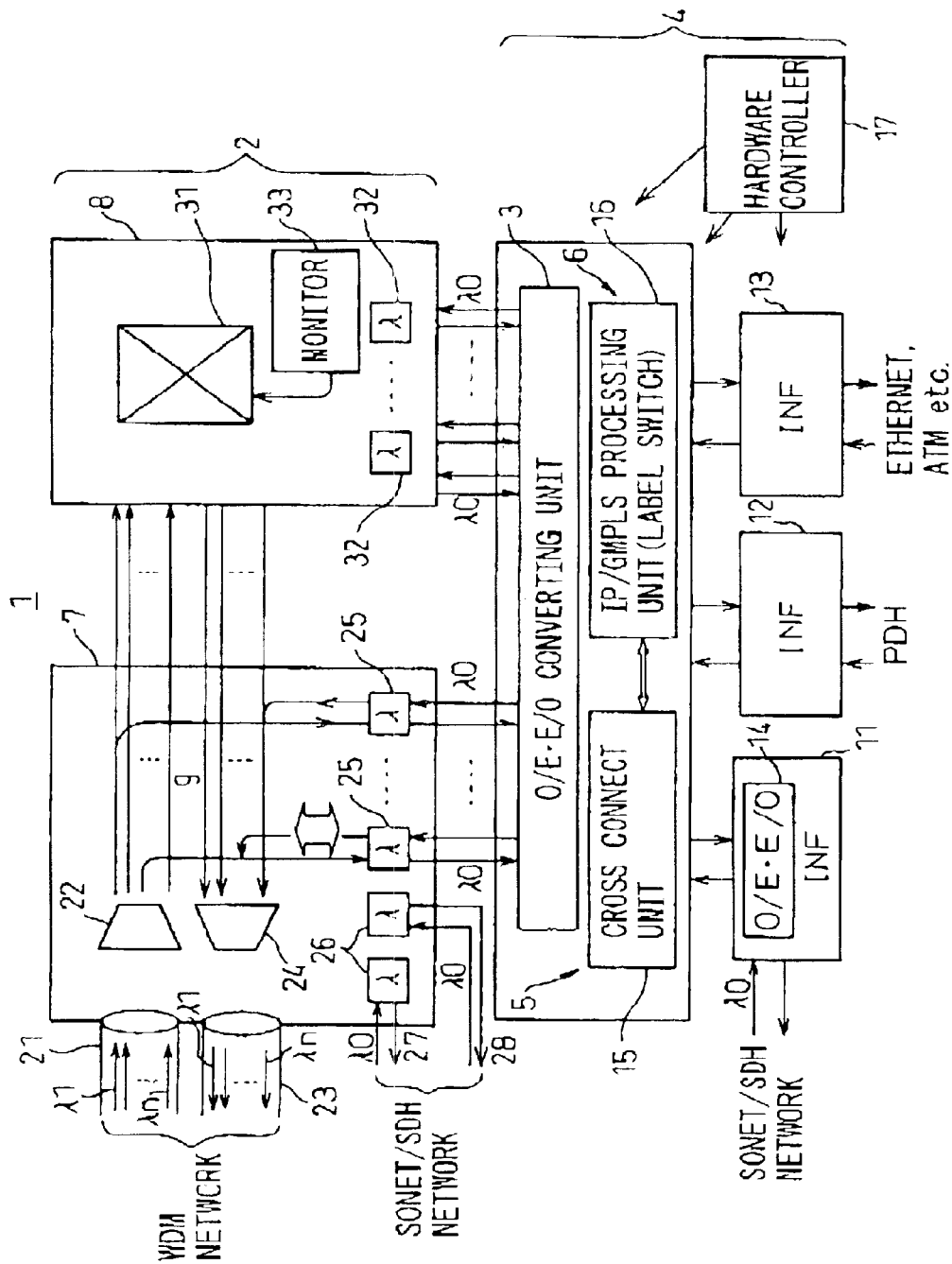
FIG. 2 is a view of a transmission apparatus according to an embodiment of the present invention.

FIG. 2 is a view of a transmission apparatus of an embodiment of the present invention.

As already explained, the present invention will be described with reference to a configuration employing the optical signal transmission section 2 of FIG. 1(b) as the optical signal transmission section 2' of FIG. 1(a). This configuration is shown in FIG 2. Note that throughout the figures, similar components are assigned the same reference numerals or symbols.

In FIG. 2, the top part shows the already explained optical signal transmission section 2, while the bottom part shows the electrical signal transmission section 4. Between these is provided an opto-electric two-way (O/E-E/O) conversion unit 3. FIG. 2, however, shows an example where this O/E-E/O conversion unit 3 is provided at the electrical signal transmission section 4 side.

First, looking at the optical signal transmission section 2 at the top part of the figure, this section is comprised of an optical add/drop function unit 7 and an optical cross connect function unit B.

The optical add/drop function unit 7 is built around an add/drop multiplexer 9 positioned at the center of the optical add/drop function unit 7 in the figure. This multiplexer 9 is first of all connected to a WDM network side incoming optical fiber 21 and outgoing optical fiber 23 through an optical post-amplifier 22 and optical pre-amplifier 24, second is connected to an optical cross connect unit 31 in the optical cross connect function unit 8, and third is connected to the O/E-E/O conversion unit 3 through a wavelength conversion unit 25. Further, it is connected to the outside SONET/SDH network side through a wavelength conversion unit 26.

At the WDM network side, there are a large number of optical signals of different wavelengths ($\lambda 1$ to $\lambda n$). In cooperation with the O/E-E/O conversion unit 3, however, it is preferable to make these optical signals a single wavelength for ease of processing Further, in cooperation with the external SONET/SDH network, it is preferable to make these optical signals a fixed single wavelength. This single wavelength is shown overall as $\lambda 0$. The wavelength conversion units 25, 26 are provided for this purpose.

The same also applies to the optical cross connect function unit 8 of FIG. 2. The wavelength conversion unit 32 is provided for this purpose. In this optical cross connect function unit 8, the wavelength conversion unit 32 is connected to the optical cross connect unit 31. This optical cross connect unit 31 switches the paths for each wavelength. The paths are switched for each wavelength by a monitoring unit 33 determining in advance which wavelength ($\lambda 1$ to $\lambda n$) is carrying which bundle of MPLS signals.

Figure 13:
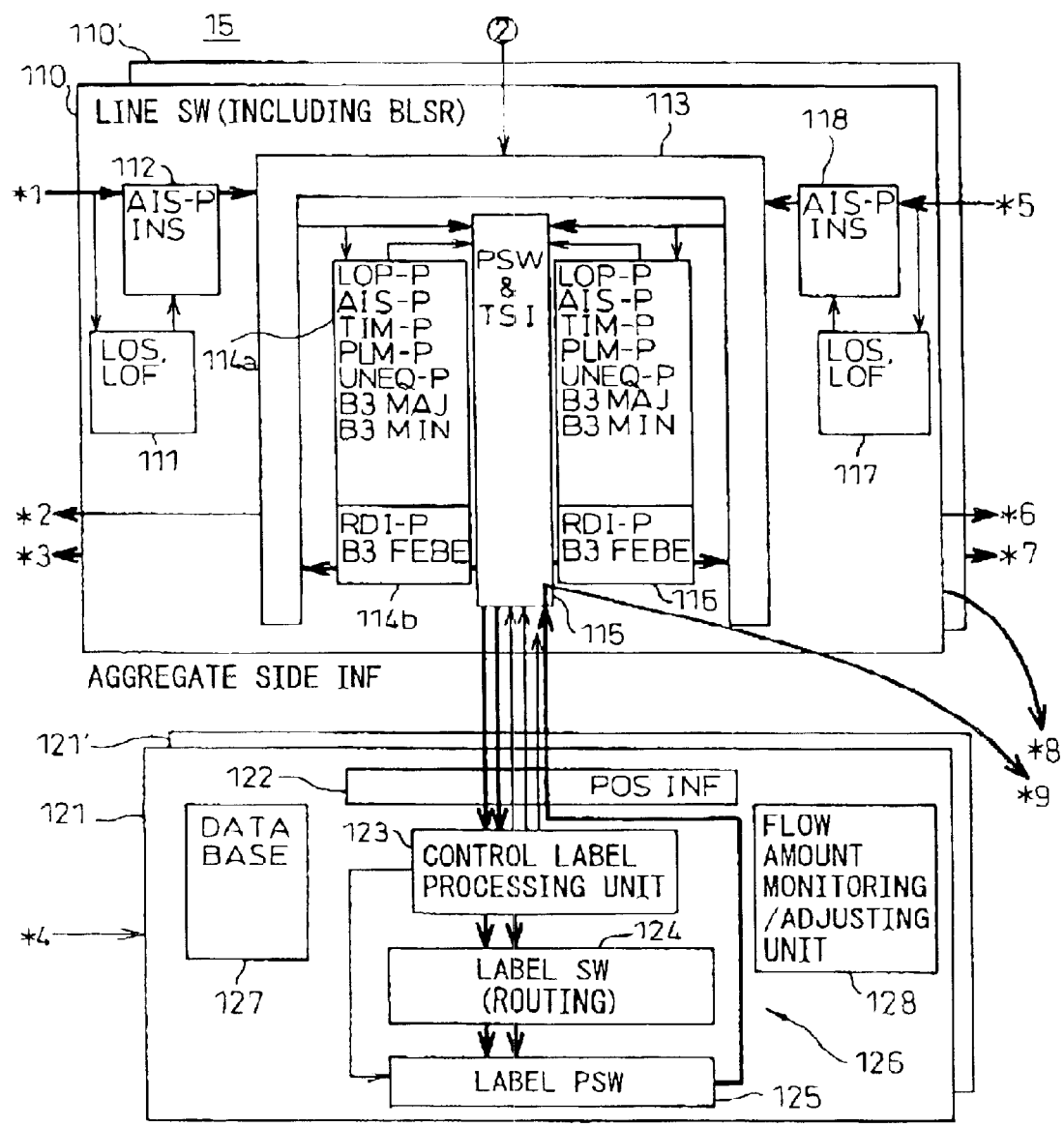
FIG. 13 is a second part of a view of a detailed example of the main parts of an electrical signal transmission section.

On the other hand, looking at the electrical signal transmission section 4 shown at the bottom of FIG. 2, this includes an O/E-E/O conversion unit 3, a SONET/SDH signal processing function unit realized by a cross connect unit 15, and an IP/GMPLS function processing function unit 6 realized by an IP/GMPLS processing unit 16 including a label switch unit (126 in FIG. 13). Further, it is provided with external line interfaces connected to the cross connect unit 15. As the external line interfaces, a card type SONET/SDH external line interface 11, a card type PDH external line interface 12, and a card type Ethernet-ATM external line interface 13 are shown. The SONET/SDH external line interface card (11) is provided inside it with an opto-electric two-way (O/E-E/O) conversion unit 14.

The components of the electrical signal transmission section 4 and the optical signal transmission section 2 are controlled by a hardware controller 17.

Summarizing the above, the SONET/SDH signal processing function unit 5 includes a cross connect unit 15. This cross connect unit 15 extracts from the SONET/SDH signal a GMPLS compatible signal compatible with the GMPLS and cooperates with the GMPLS function processing function unit 6.

The cross connect unit 15 is connected to various external line interface cards for interfacing with external SONET/SDH signals, PDH signals, ATM signals, Ethernet signals, etc.

The GMPLS function processing function unit 6 includes a label switch unit (126 in FIG. 13).

On the other hand, summarizing the already explained optical signal transmission section 2, the optical add/drop function unit 7 includes a first optical interface. The first optical interface is a first wavelength conversion unit 25 for transferring an optical signal with an O/E-E/O conversion unit 3 at a particular wavelength ($\lambda 0$).

Similarly, the optical cross connect function unit 8 includes a second optical interface. The second optical interface is a second wavelength conversion unit 32 for transferring an optical signal with an O/E-E/O conversion unit 3 at a particular wavelength ($\lambda 0$).

The add/drop function unit 7 includes a third optical interface. The third optical interface is a third wavelength conversion unit 26 for transferring an optical signal with an external SONET/SDH network at a particular wavelength ($\lambda 0$).

The optical cross connect function unit 8 is connected with an external WDM network through the optical add/drop function unit 7.

The embodiment of FIG. 2 summarized above will be explained further detail next.

First, the flow of the primary signals will be focused on and the features of the external interfaces and hardware interfaces will be explained.

The WDM interface (7) multiplexes optical signals of N number of wavelengths $\lambda 1$ to $\lambda n$ on a single fiber (21, 23). The WDM network not only amplifies the signals as a whole linearly, but also is effective if configured in a ring configuration (FIGS. 15 and 16) or a mesh configuration (FIG. 17), so the WDM interface can have a plurality of input/output units (27, 28). Further, the optical cross connect function unit 8 functions to switch paths and bypass line faults for each wavelength. Therefore, this portion also handles light of a plurality of wavelengths $\lambda 1$ to $\lambda n$. Note that for amplifying the optical signals, it is also possible to insert Raman amplifiers or other optical amplification mechanisms into the paths of the $\lambda 1$ to $\lambda n$ lights.

The optical signal transmission section (WDM hardware) 2 has the function of adding/dropping to the WDM network SONET/SDH signals of a particular wavelength $\lambda 0$ (normally 1.5 $\mu m$ or 1.3 $\mu m$) (OC-768/OC-192/OC-48 etc.) or bit-free optical signals not limited to the SONET/SDH. It further has wavelength conversion functions (25, 26) in the WDM interface 7 for multiplexing and demultiplexing a $\lambda 0$ optical signal of a plurality of channels with $\lambda 1$ to $\lambda n$ light.

One efficient method for IP traffic engineering in an WDM network is to perform mapping while dividing wavelengths for paths indicated by G-MPLS labels when finally mapping IP signals in WDM photonic frames (new G.709 recommendation under study at ITU-T). Further, if placing route information at specific positions in the photonic frames, it is possible to easily select paths for each wavelength at an optical cross connect (optical XC) unit 31.

An optical signal has the merit of faster and easier signal transmission and processing compared with an electrical signal, but has the demerit of difficult buffering. Therefore, the technique adopted in this embodiment is realistic.

stuffing the IP's of the same route (GMPLS) in a single wavelength would be inefficient, so for finer IP traffic engineering, the corresponding WDM optical signals are converted to electrical signals for processing. The setup for this is the block (O/E-E/O conversion unit 3) in the middle of FIG. 2. This block is characterized by having an O/E-E/O conversion unit corresponding to a plurality of channels. The O/E-E/O conversion unit exists as a general part for converting an optical signal of a particular wavelength $\lambda 0$ to electrical signals, so if providing wavelength conversion units 25 in the routes of the $\lambda 1$ to $\lambda n$ lights and using those conversion units 25 to interface with the O/E-E/O conversion unit 3, the unit can be realized at a low cost. Further, if setting the speeds of the ports to 40G, 10G, or 2.5G SONET/SDH bit rates, a standard O/E-E/O conversion unit can be used. It is also possible to give the wavelength conversion units a speed conversion function. Of course, if realizing a variable wavelength O/E-E/O conversion unit, there would no longer be a need to separately provide a wavelength conversion unit and O/E-E/O conversion unit for each route, so more flexible, compact hardware could be realized.

Once converting the primary signals to electrical signals in this way, it becomes possible to easily decompose them to lower order signals by SONET/SDH, so finer cross connection and more effective use of lines become possible. Further, it becomes possible to perform GMPLS label switching finer. Note that if synchronizing the signals with a reference clock of the transmission apparatus 1 after conversion to electrical signals, the signals can be processed more efficiently. In the case of electrical signals, however, there are limits to the speed of processing compared with optical signals (limit of several 10 s of GHz), so it is necessary to suitably convert the electrical signals from a serial to parallel (S/P) format to lower the speed for processing. If converting to a parallel format for lowering the speed, however, the number of signal lines required inevitably ends up increasing Therefore, if trying to increase the switch (cross connect) capacity as much as possible (to over the Terabyte level), sooner or later the number of signal lines will become a bottleneck. In this case, the merits of the memory function, a basic feature natural in electrical signals, but difficult with optical signals, become tremendous, so there is a tradeoff between optical signal processing and electrical signal processing. To utilize to the maximum the merits of optical signal processing and electrical signal processing, it is preferable to perform the simple functions of handling high speed signals, multiplexing and demultiplexing signals, and switching routes of paths as much as possible in the optical signal state. Further, the high speed interfacing between functional blocks in the transmission apparatus should be performed in the optical signal state as much as possible as well. On the other hand, it is advantageous if complicated processing, that is, fine switching, network management, control in the apparatus, and other processing be handled in the electrical signal state.

The embodiment of FIG. 2 was designed from this perspective. Additionally, stress was placed on how lost a cost the O/E-E/O conversion unit or optical route units could be realized by. Further, the electrical processing unit (4) performs as much processing as possible in a single LSI to reduce the interconnects on the board at the time of packaging as much as possible and thereby handle as much complicated functions as possible in a small space. This is also an important point.

Referring again to FIG. 2, the bottom part (4) in the figure has the new function of making a conventional SONET/SDH transmission apparatus (including an ADM/cross connect apparatus) compatible with IP traffic engineering based on GMPLS (see 4 of FIG. 1(a)). This block (4) not only has the function of interfacing of 40G, 10G, 2.5G, 622M, 155M, . . . (=OC768, OC192, OC48, OC12, OC3, . . . ) SONET/SDH bit rates, but also signal add/drop functions for DS3, DS1, E1, and other PDE signals, ATM signals, and LAN (Ethernet) signals, so can provide various detailed services and thereby can support transmission on networks close to access networks or edge networks. In this regard, in the past, SONET/SDH networks and router-router traffic were separately managed, but the present invention realizes a SONET/SDH apparatus compatible with GMPLS and thereby enables integrated network management. The configuration of the hardware part (4) will be explained in further detail below.

The signals of the 40G, 10G, 2.5G, 622M, OC768, OC192, OC48, OC12, . . . ) optical SONET/SDH interfaces are converted to electrical signals at the O/E-E/O conversion unit 3, then the electrical signals are synchronized with the reference clock of the transmission apparatus 1 to obtain electrical signals based on SONET/SDH STS-48 (STM16)/STS-12 (STM4) signals, so as to form an interblock interface. The specific format of the electrical signals is shown in FIG. 3 to FIG. 5.

FIG. 3 is a view of a known example of the overhead configuration based on STS-12, FIG. 4 is a view of a known example of overhead information based on STS-12, and FIG. 5 is a view of a known example of concatenation information of an E1 byte based on STS-12. FIG. 3 to FIG. 5, however, are merely for reference.

In FIG. 3, when based on the above STS-48 signal, the overhead is comprised of four times the #1 to #12, that is, #1 to #48.

The E1 byte shown in FIG. 4 includes the concatenation indication information received at the receiving terminal added in a form based on the table shown in FIG. 5.

Note that at the time of the status of STS-24/STS-48, information the same as the above is added even in the case of another line at the backboard (BWB) side output.

Returning to FIG. 2, the connections between the cross connect unit 15 having a GMPLS function and the various external line interfaces (11, 12, 13) are formed centered around the cross connect unit 15. This enables the cross connect unit 15 to centrally manage the interfaces efficiently. If the amount of processing becomes too large and central management becomes difficult, the external interfaces (11, 12, 13) may be assigned dispersed functions or management thereof managed centrally.

Next, the processing at the cross connect unit 15 will be looked at. If mapping the IP signals in the SONET/SDH signals 50 as to store XR signals having GMPLS labels indicating the same routes in the same SONET/SDH path such as STS-1, STS-3c, STS-12c, and STS-48c, it is possible to perform switching and network management by exactly the same processing as an ordinary SONET/SDH cross connect unit.

If however desiring to use the SONET/SDH lines most efficiently at the time of transmission, the following processing technique should be adopted.

The cross connect unit 15 decomposes a SONET/SDH frame to pick out the GMPLS signal. It then recognizes a predetermined header of the GMPLS signal and determines the path to send the IP signal out from the transmission apparatus accordingly. It then again maps this on the SONET/SDH signal and transmits the result to the path leading to a desired destination.

When recognizing the header of the GMPLS, the unit also discriminates the fault information of the line on the IP path and takes suitable bypassing measures. Further, if the transmission apparatus detects fault information in a line itself, it adds that information to the GMPLS header to enable another transmission apparatus to perform processing to bypass the faulty path.

In this way, the line information is handled integrally not only between one router and another, but also at a transmission apparatus in the middle recognizing the GMPLS, and whereby it becomes possible to manage the whole network centrally.

Another characteristic of the present invention lies in the point of using an FB (frame base)-ATM cell in the IP/GMPLS processing unit 16 of FIG. 2. This will be explained with reference to FIG. 6.

Figure 6:
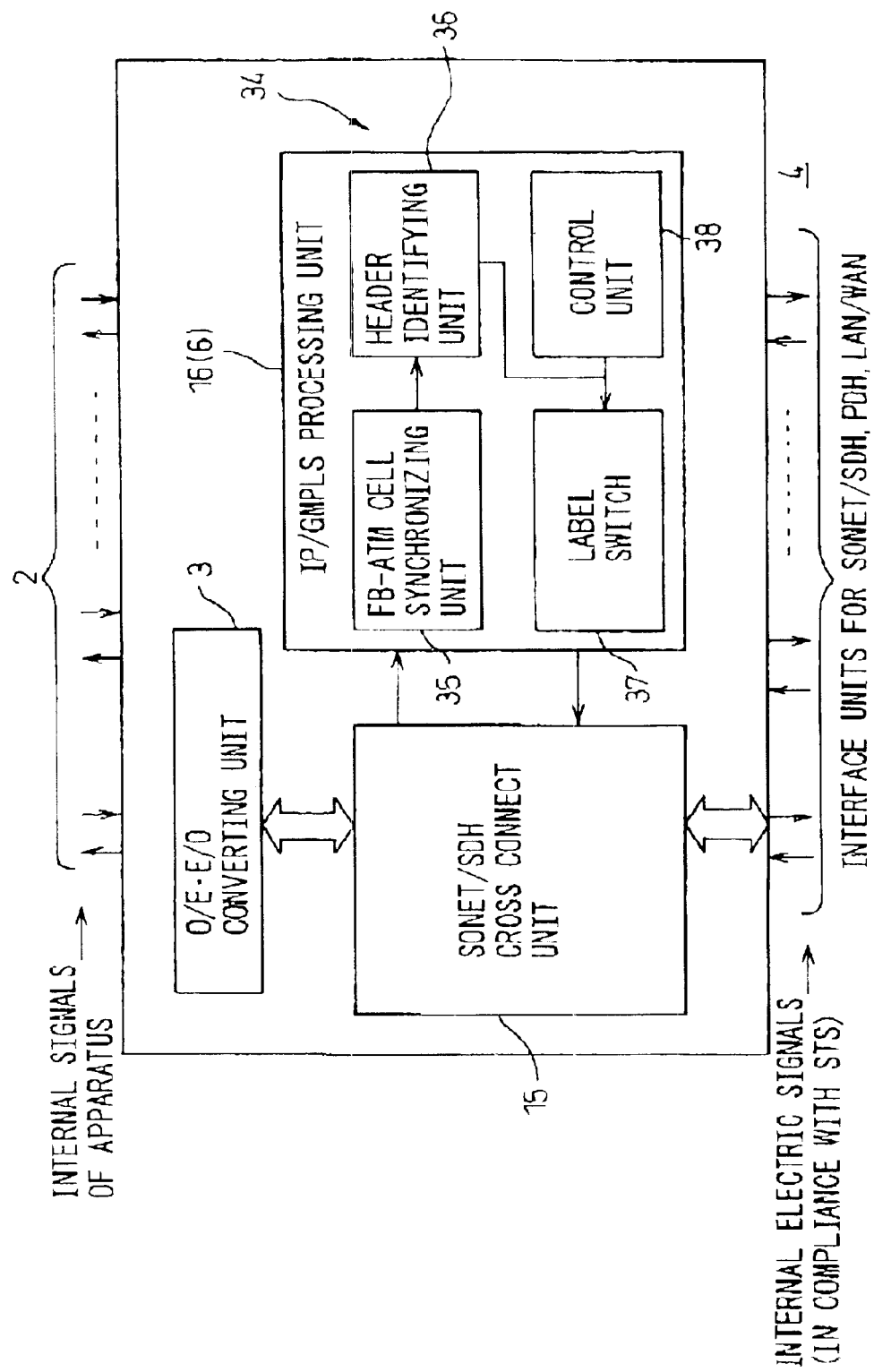
FIG. 6 is a perspective view of an example of an electrical signal transmission section compatible with FB-ATM.

FIG. 6 is a view of an example of an FB-ATM compatible electrical signal transmission section 4.

The point to note in this figure is that the GMPLS function processing function unit 6 is provided with an FB-ATM processing unit 34 for processing FB-ATM cells. The rest of the configuration is the same as the configuration shown in FIG. 2.

The payload signal obtained by removing the overhead from the SONET/SDH frame is output from the SONET/SDH cross connect unit 15 and first input to an FB-ATM cell synchronization unit 35 where cell synchronization is established. Further, the header of the cell is identified at a header identifying unit 36, the cell is labeled at a label switch 37, the path to the desired destination is set, then the cell is returned to the cross connect unit 15.

The cross connect unit 15 and the IP/GMPLS processing unit 16 receive as input the optical signals from the WDM/OADM/OXC side (optical signal transmission section Z side) at the ports corresponding to the different paths. As explained above, an O/E-E/O conversion unit 3 is provided there for converting the optical signals to electrical signals, then the electrical signals are synchronized with a reference clock of the apparatus. Note that if this O/E-E/O conversion unit 3 is provided compactly with a wavelength conversion unit or speed conversion unit, there is no linger a need for providing a wavelength conversion unit at the WDM/OADM/OXC side except at the external line connection unit (side demultiplexed for each wavelength). Therefore, at the WDM/OADM/OXC side, processing for just path adjustment (adding/dropping of wavelengths and path switching) is sufficient. When desiring to amplify the light, however, an optical amplification unit is added. Therefore, the WDM/OADM/OXC side becomes simpler and can be configured at a lower cost.

The SONET/SDH, PDH, LAN/WAN interfaces input electrical signals based on an STS frame (SONET/SDH frame) to the cross connect IP/GMPLS processing units (15, 16) at the respective ports (for the electrical signals, see FIG. 3 to FIG. 5).

The SONET/SDH cross connect unit 15 is provided with an overhead terminating and adding function and can suitably perform alarm processing or line control. Further, it can demultiplex a signal down to an order desired for cross connection and cross connect at the desired level (VC-11, VC-12, VC-3, VC-4, VC-4-4c, VC-4-16c).

This SONET/SDH cross connect unit 15 sends to the IP/GMPLS processing unit 16 the GMPLS signal from the outside of which the SONET/SDH frame has been removed. Further, the IP/GMPLS processing unit 6 inputs to the SONET/SDH cross connect unit 15 a signal suitably processed at the IP/GMPLS processing unit 16 and directed to a path leading to the desired destination. Note that up to here, the processing is the same as that at the cross connect IP/GMPLS processing unit (15, 16) of FIG. 2, but in FIG. 6, the IP/GMPLS processing unit 16 can perform the FB-ATM processing being formulated at the ATM-Forum. That is, it performs cell synchronization on the FB-ATM cells, finds cell boundaries, reads the header, performs switching in accordance with the routing table, and then selects the path to the destination.

At this time, it is also possible to monitor the flow or adjust the flow (shaping function) or set the priority order of the cells to easily set the Qos for each cell under the control of the control unit 38.

There has already been experienced with the use of ATM base cells as a technique for handling operation, administration., and maintenance (OAM). By sending line fault information etc. to a downstream or upstream transmission apparatus, suitable control of switching virtual paths becomes possible.

Further, looking at the FB-ATM processing unit 34, for example, it is possible to use the expanded ATM cell and/or variable length ATM cell processing function unit previously proposed by the same assignee (Japanese Patent Application No. 12-364098). Due to this, it is possible to easily perform QoS control or line management (bypass paths at the time of faults etc.)

The expanded ATM cells are cells of mixed fixed length ATM cells and variable length ATM cells. Here, the variable length ATM cells mean the following.

Figure 7:
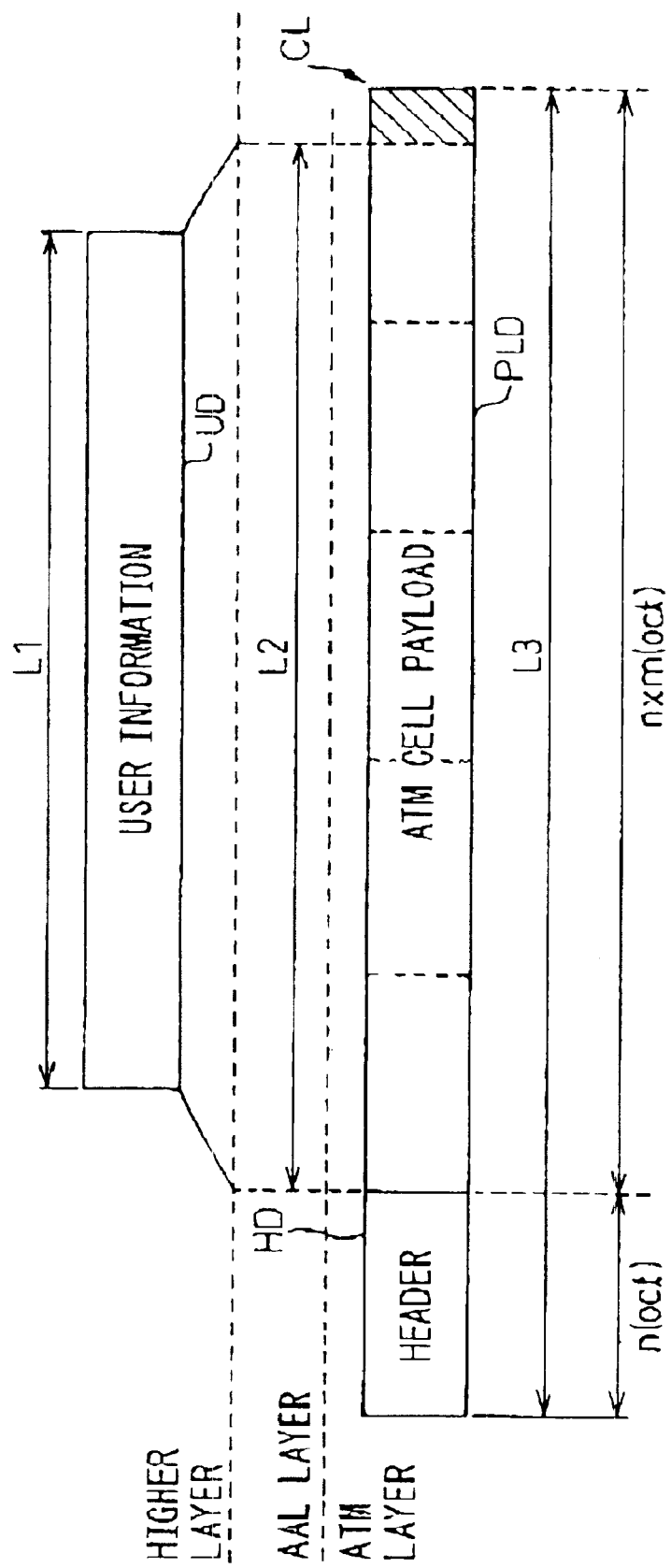
FIG. 7 is a view for explaining a variable length ATM cell.

FIG. 7 is a view for explaining a variable length ATM cell.

A variable length ATM cell is an ATM cell of a variable payload length not limited to 48 bytes. In an ATM layer, a length of n ($8 \geq n \geq 6$) is used as the minimum transfer unit, and an n-octet header HD and an ATM cell payload PLD of a length of a whole multiple (m, $m \geq 1$) of the minimum transfer unit form a variable length ATM cell CL. The payload PLD stores the information generated from the higher layer adjusted to a length of a whole multiple of the minimum transfer unit. The header HD is set with data RCC indicating the length of the variable length cell. This adjustment is performed by adding invalid data so that the SAR protocol data unit (SAR-PDU) including the header and the trailer in the higher ATM adaptation layer becomes a whole multiple of n octets. The trailer is set with the remaining number of octets (hatched portion) after dividing the number of valid information octets by 44. The "44" is based on the fact that the SAR-PDU payload is 44 bytes when the higher layer AAL in the 48 bytes forming the payload of conventional fixed length cells has a SAR structure (cell decomposition/composition setup). when fixed length cells and variable length cells are mixed, it is possible to discriminate between these by discriminating if the header length is n octets or 5 octets. The processing of the fixed length cells is for example processing similar to the past after selection.

Figure 8:
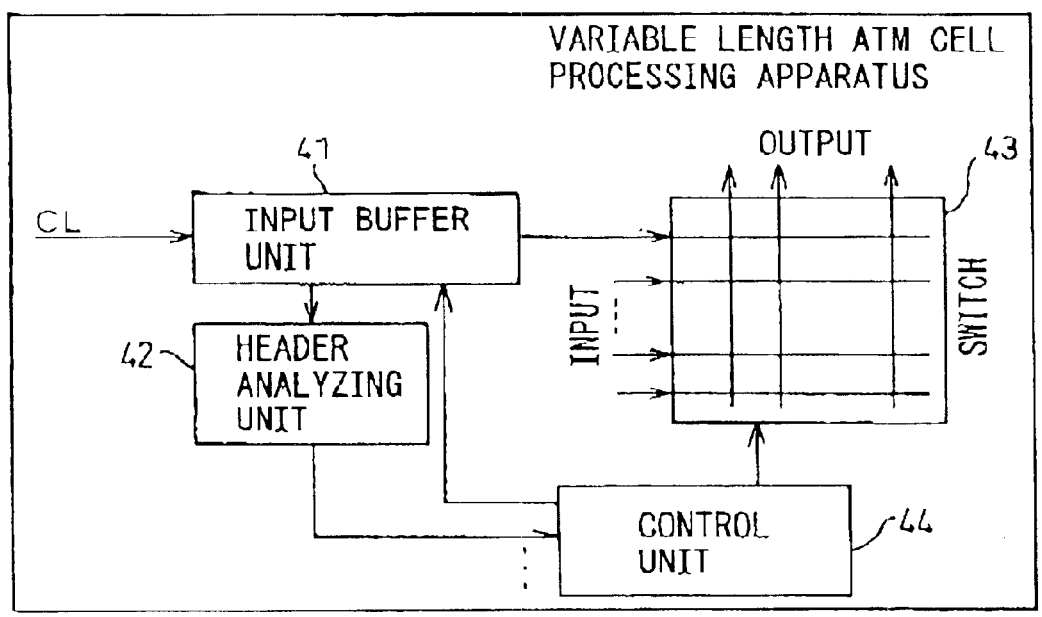
FIG. 8 is a view of an example of a processing function unit for a variable length ATM cell.

FIG. 8 is a view of an example of the processing function unit for a variable length ATM cell.

In the figure, reference numeral 41 is an input buffer unit, 42 is a header analyzing unit, 43 is a switch, and 44 is a control unit. As shown in FIG. 6, when user information UD of any length L1 occurs at the higher layer, regardless of its length, it is transferred to the ATM adaptation layer (AAL) as one block of information. A corresponding header and trailer are added there, whereby a data unit of a length shown by L2 is composed. The data unit of the length L2 is composed as a variable length ATM cell CL shown by L3 at the ATM layer. This variable length ATM cell CL has a header HD of the minimum transfer unit, that is, n octets (oct), and an ATM cell payload PLD of n×m oct. That is, the data unit of the ATM adaptation layer (AAL) is divided into m ($m \geq 1$) times n octets. When data not filling up n octets finally occurs, it is adjusted to n octets by adding invalid octets (hatched portion), thereby giving an ATM cell payload PLD of n×m oct. The total length of the variable length ATM cell CL is n×(m+1) oct, the minimum cell length becomes n×2 oct (including header), and the maximum cell length becomes n×(M+1) if the maximum value of m is M.

Next, the entire network including a plurality of transmission apparatuses will be considered.

Figure 9A:
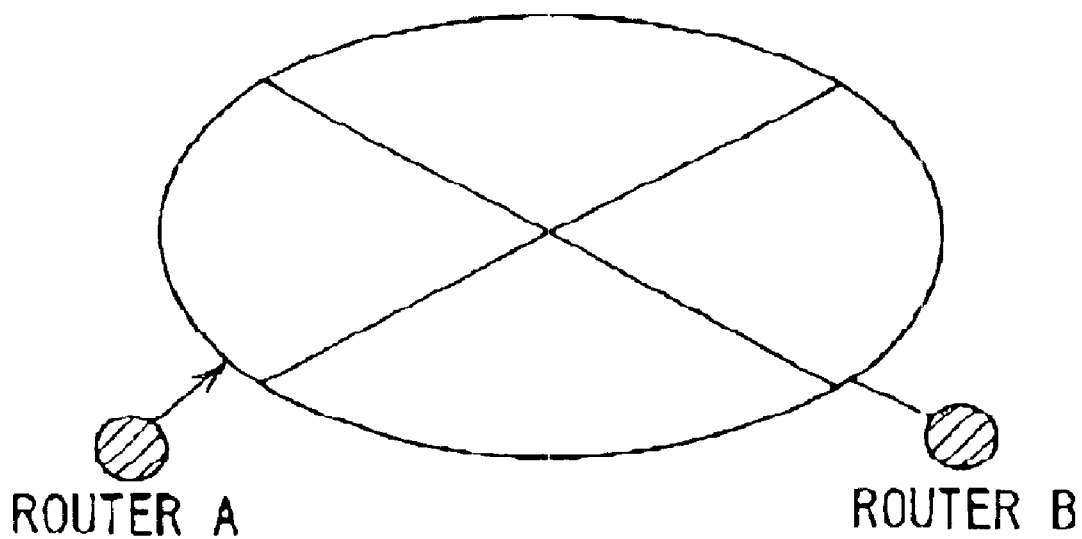
Figure 9B:
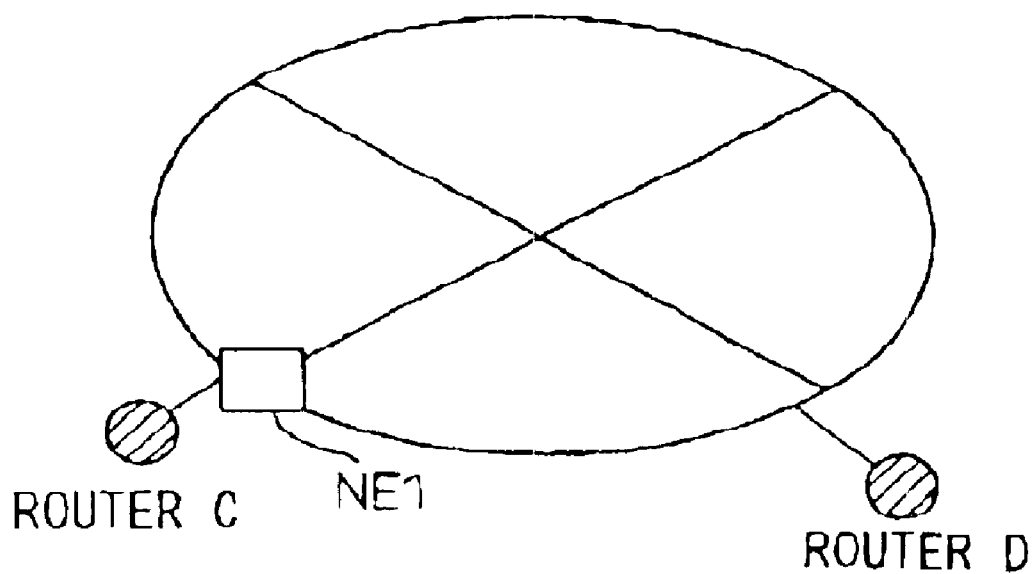
FIG. 9(b) is a view of an example of a network configuration according to the present invention.

FIG. 9(a) shows an example of a conventional network configuration, while FIG. 9(b) shows an example of a network configuration according to the present invention.

In FIG. 9(a), a transport networks such as the SONET/SDH or WDM is a conventional one. Therefore, this is a case where a transport network does not compatible with TCP/IP routing table or MPLS.

In this case, the packets are forwarded from the router A in the arrow direction, the signal at the destination only reflects information linked with the router B at the routing tables.

On the other hand, at the transport network side, it is necessary to set up the paths so that input from the router A is output to the corresponding port of the router B. That is, it is necessary to cross connect nodes of the transport network in this way.

The settings at the transport network side have to be independent from those at the router side layer (virtual paths). Regardless of the traffic (change in flow of packets), it is necessary to secure in a fixed manner the maximum bandwidth in accordance with the requirements of the users of the paths in the transport network. The reason is that with a conventional SONET/SDH layer or WDM layer, it is only possible to secure a fixed bandwidth. The layer is not suited to statistical multiplexing like demands such as for flexibly dealing with temporal fluctuations in traffic. This is because it is necessary to reset the cross connects each time the path settings are changed. A SONET/SDH network, however, has the merit that if setting the paths and ring protection in advance, any faulty line is instantaneously (within 50 ms) switched to a protection line and a high quality of communication is thereby guaranteed.

One of the effects of the network according to the present invention will be explained next with reference to FIG. 9(b).

If the transmission network is made compatible with hybrid processing such as MPLS switches, the following merits accrue. That is, it is possible to handle the processing of virtual paths at the MPLS layer, so the effects of statistical multiplexing appear and effective use of bandwidth becomes possible. For example, it is possible to allocate thick paths when traffic is heavy and allocate thin paths when traffic is light.

If using MPLS, it is possible set classes of users (true QoS) in the same way as with ATM, so the following types of service become possible:

(i) enabling a complete guarantee of bandwidth and guarantee of the complete bandwidth up to the committed upper limit to users desiring it and (ii) enabling best effort processing for users desiring to use lines at a lower rate even at the cost of reduced priority, that is, to use lines liberally when unused, but to be cut off by yielding to other higher priority traffic when the lines are busy.

In this way, it is possible to provide flexible service to meet with user requirements and possible to efficiently use the line capacity of the transport network, so efficient network investment for the telecommunication carriers also becomes possible.

The present invention is not limited to MPLS compatible with IP packets and may also be made compatible with the Ethernet (including GbE or 10 GbE processing). MPLS compatible with not only IP packets, but also Ethernet packets is some times called EoMPLS. The processing of the present invention may also be applied to this. The same is true for wavelength ($\lambda$) router compatible MP$\lambda$So or GMPLS.

Further, the cases when the router C in FIG. 9(b) is MPLS compatible and not compatible will be explained in somewhat further detail. When the router C or router D wishes to communicate with the hybrid network of the present invention by non-MPLS compatible packets, it is sufficient for the NE1 (transmission apparatus 1) to which the packets are input from the router C to add an MPLS header and manage the MPLS layer in the hybrid network. That is, the thinking is the same as that of a virtual private network (IP-VPN). Further, when sending such a signal to the router D, the NE1 removes the MPLS header before dispatch. Therefore, there is no problem at all even if the router C or the router D is not MPLS compatible.

Further, the signals between the router C and the NE1 may be formatted using the packet-over-SONET (POS) idea to store the packets in SONET/SDH frames, to store them in optical packets scheduled for standardization by G.709, or to store them in PDH frames, Ethernet frames, or ATM frames as in the past.

The transmission apparatus (NE:Network Element) of the present invention can have various interfaces, 50 can flexibly deal with different user requirements. An example of specifically what kind of signals are processed, how MPLS is added, or how signals are switched and processed in the NE1 will be explained later.

On the other hand, when the router C or router D is MPLS compatible, the NE's of the transport network share the LSR table of the same layer (format) and perform a broader range of processing of MPLS virtual paths.

There are sometimes cases where the format differs slightly depending on the user or the manufacturer of the other transmission apparatus. In this case, it becomes necessary to optimize the format in accordance with the network. For example, it is sufficient to enable the format to be modified by software by a POS or other architecture using a network processor in the transmission apparatus. In the latter case as well, it is possible for the router ⇆ NE interfaces to use various formats.

Note that the apparatuses C and D of FIG. 9(b) are not limited to routers and may also be other LAN/WAN nodes or exchanges, switch apparatuses, etc.

The overall configuration of the network shown in FIG. 9(b) will be explained in further detail below.

Figure 10:
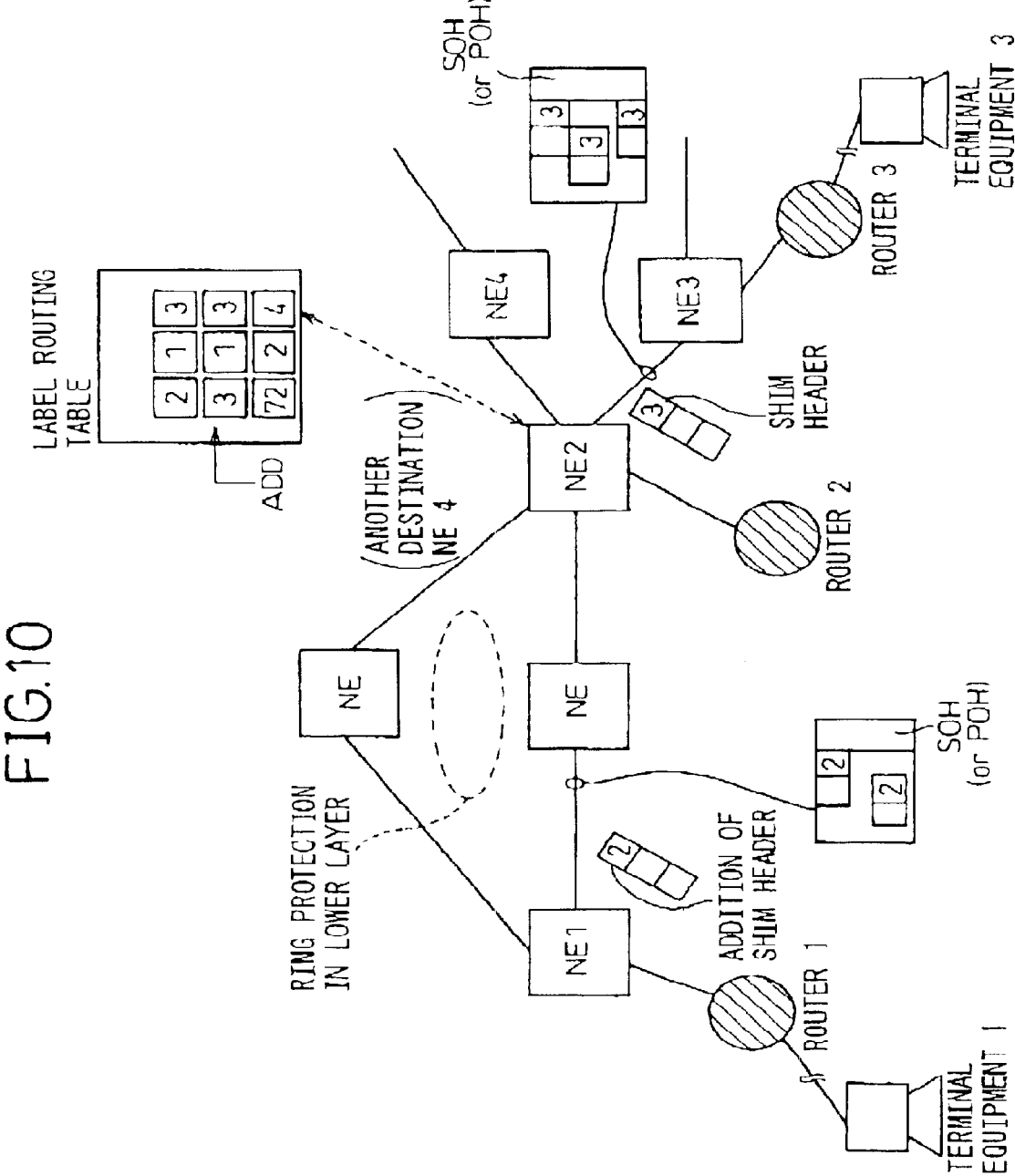
FIG. 10 is a view of an example of the overall configuration of a network shown in more detail than FIG. 9(b)

FIG. 10 is a view of an example of the overall configuration of a network shown in further detail from FIG. 9(b). The figure shows the example of transmitting IP packets using an MPLS label routing table. The same explanation can be applied to the case of transmission of Ethernet packets in addition to IP packets.

In FIG. 10, the example is shown of transmitting IP packets from a terminal 1 finally leading to a router 1 under the NE1 (transmission apparatus 1) to a terminal 3 finally leading to a router 3 under the NE3.

When an IP packet without an MPLS label is sent from the router 1 under the NE1, the NE1 adds a shim label (header for #MpLs label switching) addressed to the node 2. On the other hand, when the router 1 under the NE1 sends a packet with an MPLS compatible label, the NE1 replaces that label with a shim label addressed to NE2 matching with the desired destination.

The NE1 to the NE2, NE3, NE4, . . . can handle transport of the lower layer such as SONET/SDH or WDM optical packets. For example, a path from the NE1 to NE3 can be set by suitably cross connecting the nodes. Note that at this time, for example, it is possible to set faulty line measures such as BLSR or UPSR ring protection on the route from the NE1 to NE2. In a transport network supporting only the SONET/SDH or WDM optical packet layer, it is necessary to constantly secure bandwidth (regardless of the traffic flowing through the path), so it is not possible to efficiently utilize the network resources.

Therefore, if using ATM or MPLS or other virtual paths to enable the network to be used statistically multiplexedly as in the present invention, the efficiency of resource utilization is greatly improved.

Here, the point of the present invention is that at the NE1, packets with the same destination are first stored at the path (for example, VC-4-n or AU4-n) of the same destination (for example, NE3) as SONET/SDH or WDM optical packets. If the traffic becomes too heavy and the path of the SONET/SDH or WDM optical packets becomes insufficient by itself, the packets are stored at a path of a separate bandwidth. At this time, the packets are divided into a group for which full bandwidth is guaranteed and therefore they are not discarded and other groups depending on the priority ranking of the packets, that is, the class of QoS requirement of the user. The packets of the full guarantee class are stored in a path with guaranteed bandwidth at the SONET/SDH or WDM optical packet layer. Therefore, the packets not stored at this path are sometimes discarded depending on the priority ranking of the class set.

Once packets are stored at the SONET/SDH or WDM optical packet layer, in the case of FIG. 10, transmission to the NE2 is guaranteed. For example, even if a line fault occurs either at the clockwise path or counterclockwise path, the line will be instantaneously (within 50 ms in the case of SONET/SDH) switched to the protection side.

Here, the operation of the NE2 will be looked at. Here, new packets addressed to the same NE3 are added ("ADD" in the figure).

The routing table shown at the top right of FIG. 10 is the routing table of the NE2. Packets input from the NE1 and addressed to the NE3 are labeled "2", so the routing table is used to forward the signals to the port 1 leading to the NE3. Further, at this time, the label is changed to "3".

Similarly, packets first added at the NE2 are labeled "3" and forwarded to the port 1.

In the transport network from the NE2 to the NE2 as well, packets are stored at the path (VC-4-n or AU4-n) leading to the NE3 at the SONET/SDH or WDM optical packet layer Note that at the NE2 or NE3, sometimes the path at the SONET/SDH or WDM optical packet layer storing the packets is allocated based on the amount of traffic or the priority ranking of the packets in the same way as in the case of the NE1.

Packets addressed to the desired terminal 3 are dropped by the NE3 to the router 3 under it and finally reach the desired terminal 3.

Note that the terminals are not necessarily limited to PCs (personal computers) handling TCP/IP That is, they may also be terminals of image or speech networks communicating in real time. In the highest priority class, the bandwidth is guaranteed, so real time communication also becomes possible.

Figure 11:
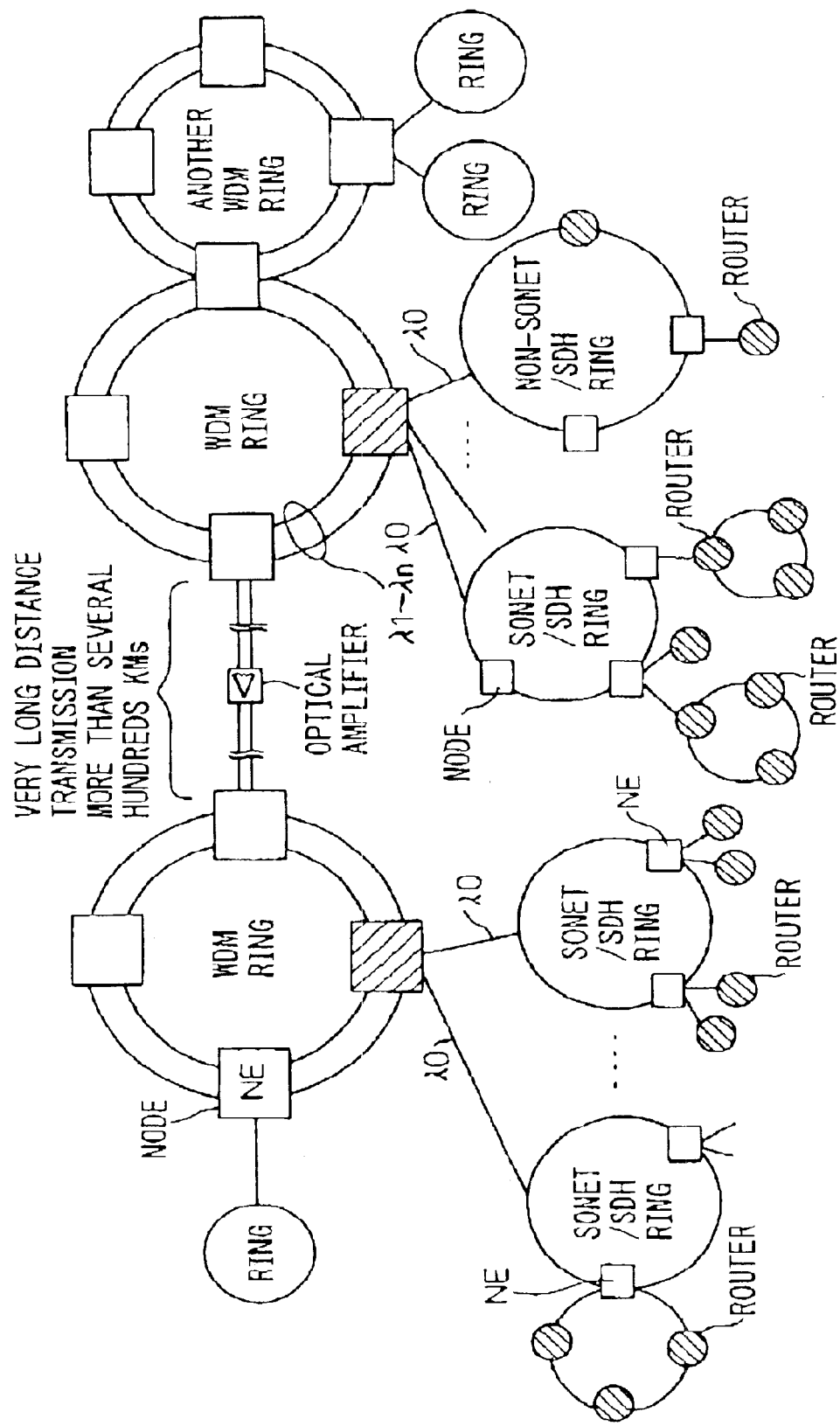
FIG. 11 is a view of an example of the configuration of a large-scale network including a transmission apparatus according to the present invention.

An example of a larger sized network configuration including the network shown in FIG. 10 is shown in FIG. 11.

FIG. 11 is a view of an example of a larger sized network configuration including the transmission apparatus according to the present invention.

The figure shows for example a Terabit class WDM ring, another WDM ring, and rings of a lower speed that these rings, for example a 100 Gbit class SONET/SDH ring and Ethernet or other non-SONET/SDH ring.

In the figure, the square blocks show NE's. The transmission apparatus 1 of the present invention is particularly preferably used for the NE's shown by the hatching at the bottom right. That is, these NE's serve the WDM and SONET/SDH in the same apparatuses. Due to this, it is possible to obtain an integral configuration for both the WDM and SONET/SDH and integrally manage the network at a low cost.

Here, the discussion will return again to consideration of the transmission apparatus alone from the consideration of the network configuration and a detailed example will be explained.

DETAILED EXAMPLES

Before explaining the detailed example, the differences between the prior art and present invention will be clarified.

As explained above, the characteristics of the LSR of FIG. 24 having a configuration closest to the present invention will be analyzed here. That is, the LSR collects the topology information of the entire MPLS layer including the topology of the optical network and uses this for integral network management.

That is, the TE topology database of FIG. 24 stores the topology information of the network as a whole. Topology information is swapped with different routers. The databases of all routers are combined for use. Therefore, the broader the range covered by the network, the larger the capacity of the database and further the more different routers have to communicate with each other. Therefore, the processing handled by traffic engineering control in the figure also ends up becoming heavier. The present invention provides a transmission apparatus able to solve this problem.

The point lies in the separation of the processing of the lower layer and the processing of the higher layer corresponding to the IP label path. Line faults can be avoided by lower layer processing. This merit of lower layer processing is utilized to the maximum to assist higher layer path processing.

Referring to FIG. 24, traffic engineering is performed by MPLS processing for the SONET/SDH network and the WDM network as a whole as well and the entire network thereby integrally managed. Conversely, in a pure light network with no electrical signal processing, management by OXC of all of the MPLS paths as well at the higher layer in the optical state is difficult.

In the present invention, by adopting the hardware configuration and processing method explained in detail below, these difficulties can be overcome and a low cost equipment and network configuration become possible. Further, it is also possible to effectively utilize existing network resources.

Next, the transmission apparatus of the present invention will be explained in detail while referring to FIG. 12 to FIG. 21.

Figure 14:
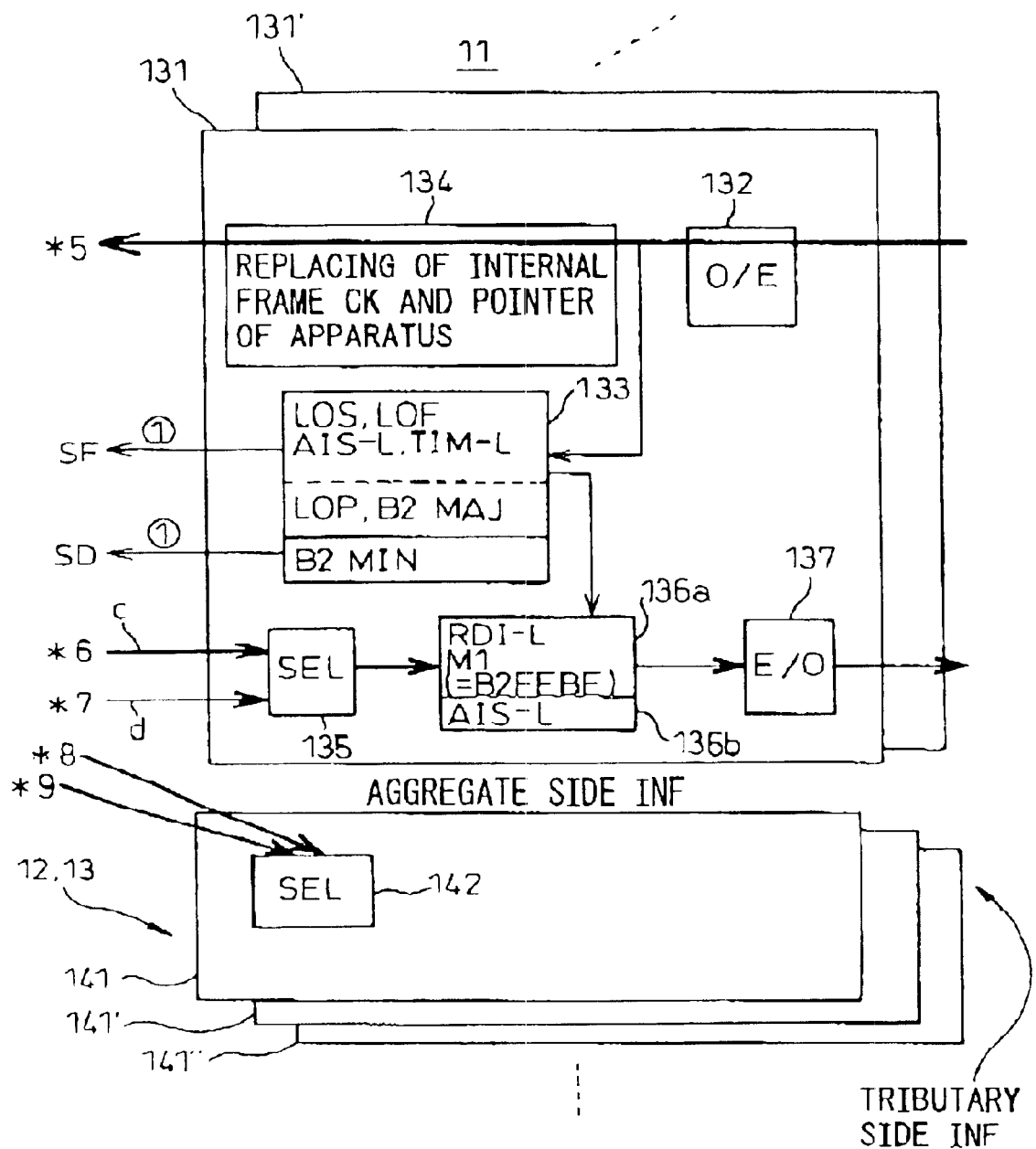
FIG. 14 is a third part of a view of a detailed example of the main parts of an electrical signal transmission section.

FIG. 12 to FIG. 14 are parts of a view of a detailed example of main parts of the electrical signal transmission section 4.

Figure 18:
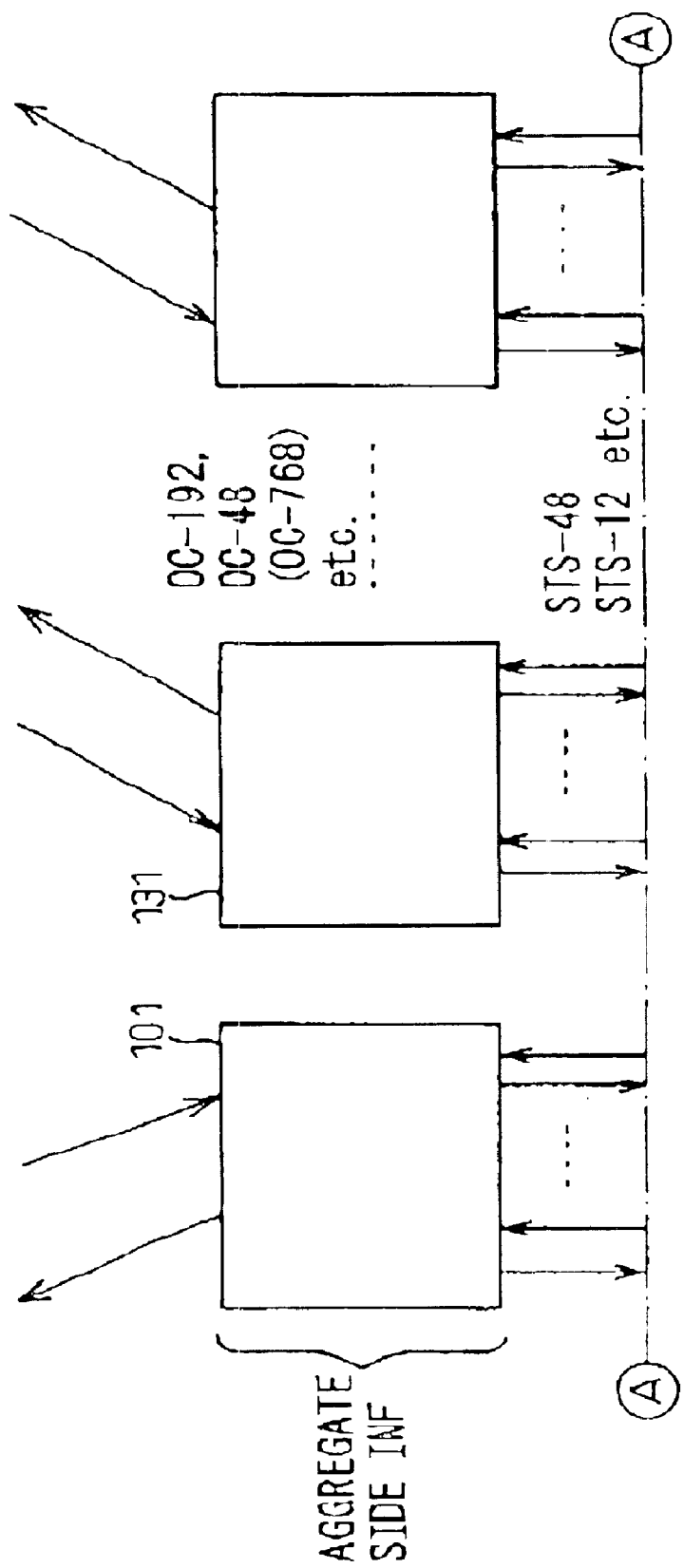
FIG. 18 is a first part of a view schematically showing the flow of signals transferred between an aggregate side and a tributary side straddling a cross-connect unit 110 in FIGS. 12 to 14.
Figure 19:
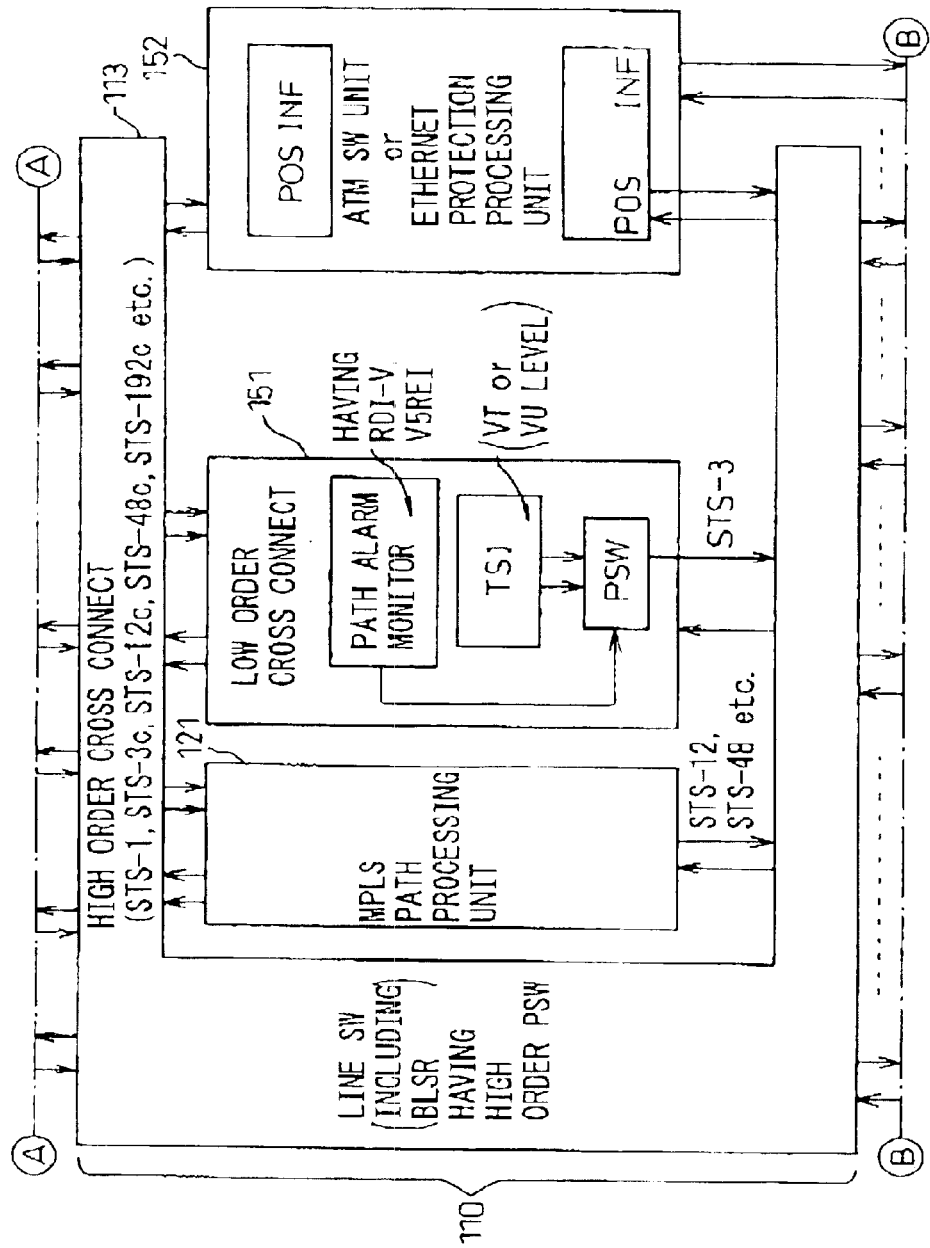
FIG. 19 is a second part of a view schematically showing the flow of signals transferred between an aggregate side and a tributary side straddling a cross-connect unit 110 in FIGS. 12 to 14.
Figure 20:
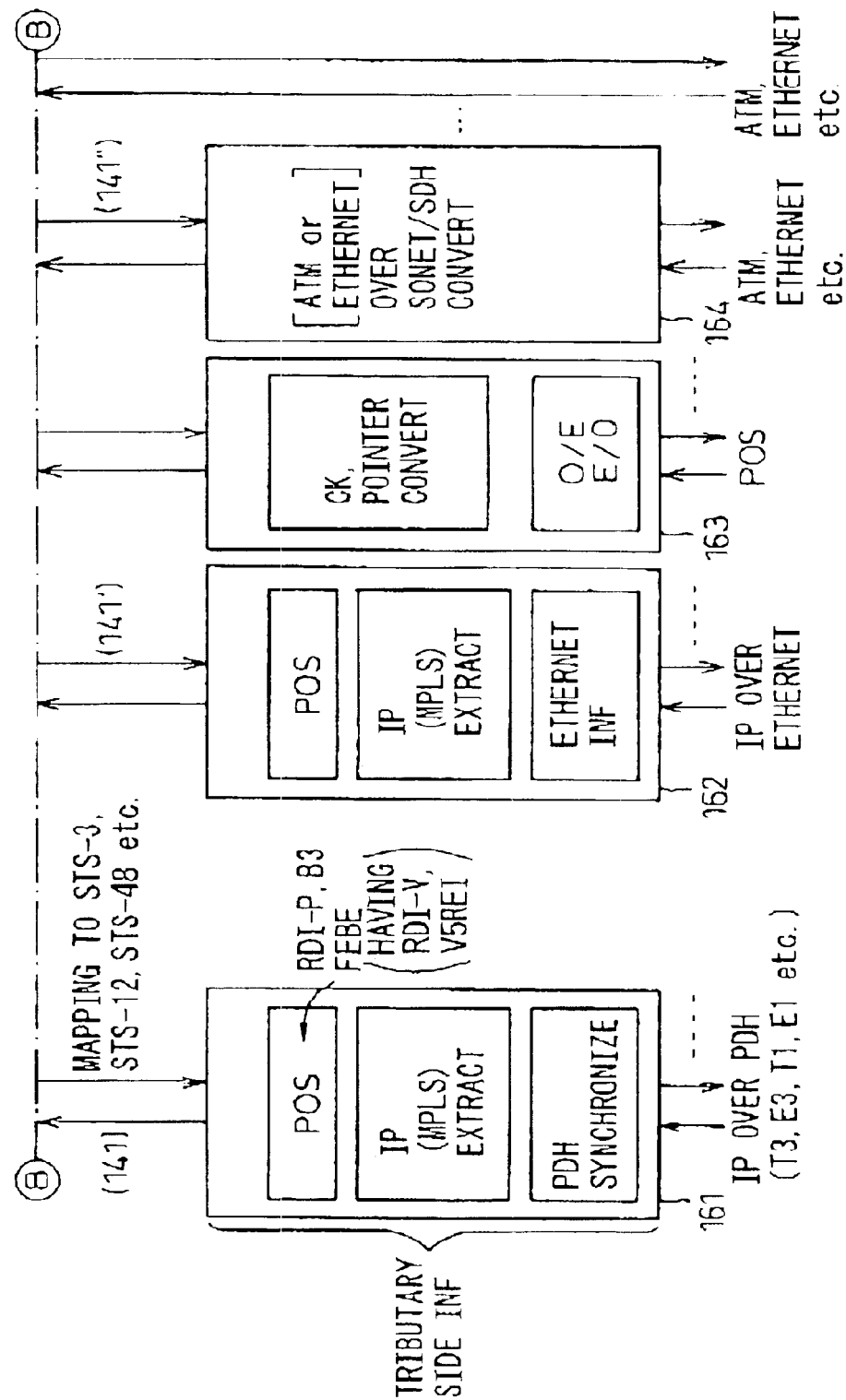
FIG. 20 is a third part of a view schematically showing the flow of signals transferred between an aggregate side and a tributary side straddling a cross-connect unit 110 in FIGS. 12 to 14.

FIG. 12 to FIG. 14 show in detail the drop side for taking out a low speed signal from a high speed ring. Note that the point of the add side is shown again in the explanation of FIG. 18 to FIG. 20 given later.

Figure 15:
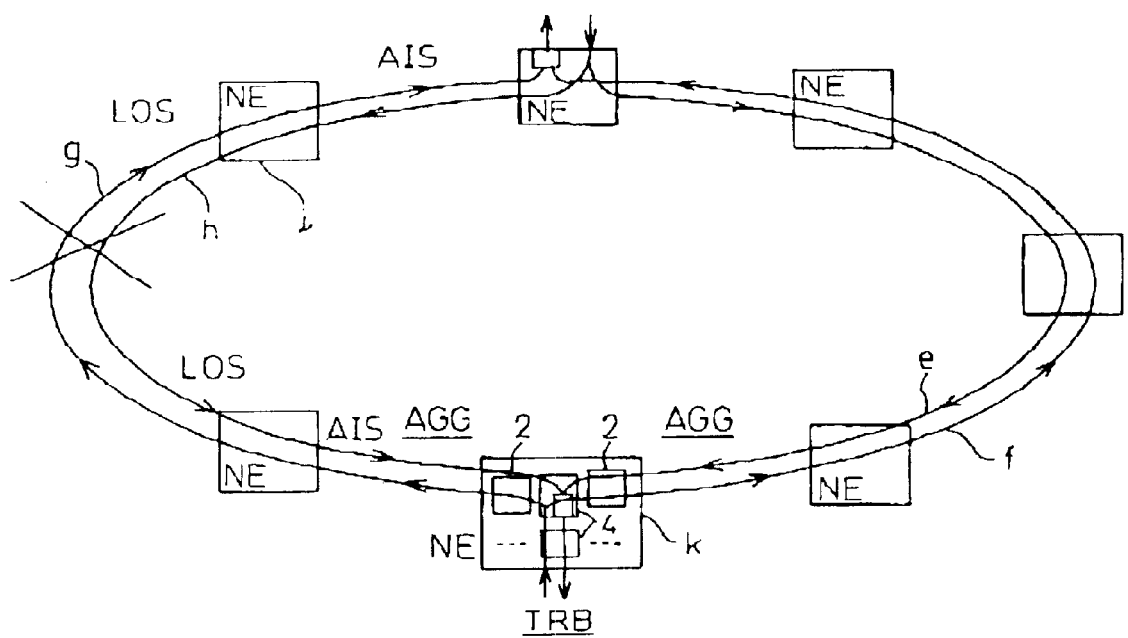
FIG. 15 is a view of a first example of a network (UPSR) to which the present invention is applied.
Figures 16A, 16B:
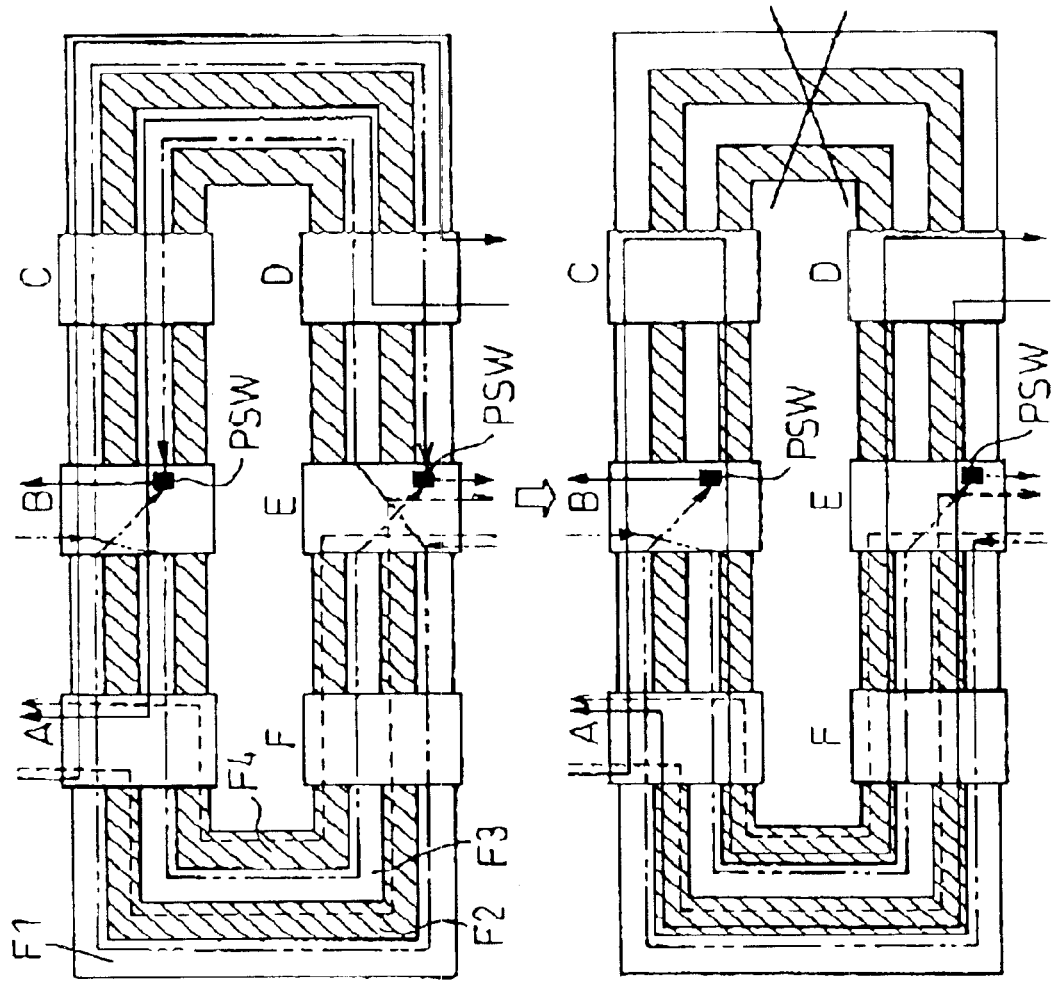
FIGS. 16(a) and 16(b) are views of a second example of a network (4F-BLSR) to which the present invention is applied.
Figure 17:
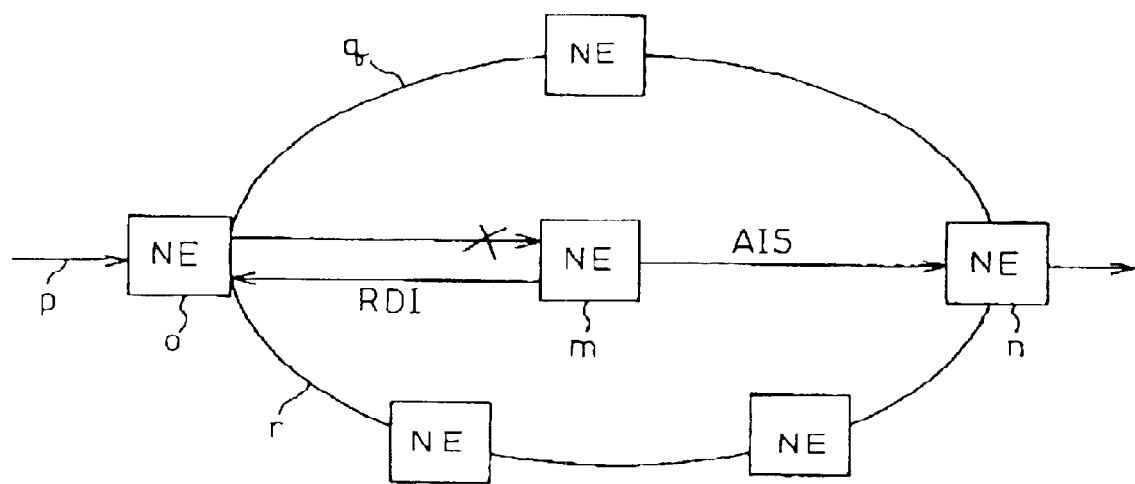
FIG. 17 is a view of a third example of a network (mesh network) to which the present invention is applied.

FIG. 12 to FIG. 14 explain, along with the flow of the signal (see thick arrows in the figure), what kind of processing should be performed to enable effective protection of the desired path in a downstream (signal receiving side) NE when a line fault (including everything from "loss of signal (LOS)" to "deterioration of quality of signal") in a signal arriving from upstream (NE of signal transmission side) in a network configuration such as shown in FIG. 15, FIG. 16, or FIG. 17 explained later and show the points of detection, the points of processing, etc. at that time.

Further, FIG. 12 to FIG. 14 show the setup for quickly informing the downstream side when a serious fault ("loss of line (LOL)", "loss of frame (LOF)", etc.) occurs upstream or for an NE receiving and detecting a fault to quickly inform the upstream side sending a signal of the fault when some sort of fault occurs in a signal sent downstream (including everything from LOS to "deterioration of quality of signal")

and to execute control for avoiding that fault automatically as much as possible. Details will be explained below.

The apparatus of FIG. 12 to FIG. 14, generally speaking, can be said to be a SONET/SDH transmission apparatus with an LSR function (add/drop MUX cross connect apparatus) able to integrally manage the network between MPLS paths (higher layer virtual paths when seen from the SONET/SDH layer) and the SONET/SDH layer. By dividing the roles of network management and priority of processing as explained later, processing becomes possible at a lower load and higher speed without placing an excessive burden on the conventionally proposed LSR such as shown in FIG. 24. One of the points is that the cross connect part of the SONET/SDH level gives line redundancy (including 1+1 type redundancy, 1:N type redundancy, BLSR, etc.) or SONET/SDH level path redundancy (including ring protection such as UPSR), then performs MPLS level label switching or path switching. The line switching and path switching at the different layers are performed by independent detectors detecting independent switching factors, but priority is given to switching processing at the lower layer (lines corresponding to lower layer of paths, while SONET/SDH paths corresponding to lower layer of MPLS paths). This is specifically performed as follows.

Lower layer switching is performed immediately after an above switching factor occurs. Higher layer switching is performed when a switching factor occurs consecutively at that layer. That is, it frequently happens that when switching a thick line due to a fault detected at the lower layer, the relatively thin line at the higher layer is also switched and therefore the switching factor at the higher layer is eliminated as well.

By switching in this way, the load of path switching at the higher layer becomes lighter. Further, when a fault cannot be restored by the redundancy configuration of the lower layer, the higher layer path switch is activated. Specifically, the following should be performed.

For example, the count operation of a timer is started simultaneously with the occurrence of a switching factor. After the set time or when the switching factor occurs, the path is switched. The set time at that time is for example made from 0 second to 10 seconds. It may be set finely in units of 100 ms or 50 ms.

Here, line switching at the lower layer will be considered. If the detection points for detecting the line switching factors are made all cross connect units (110 in FIG. 13 (corresponding to 15 of FIG. 2)), the load at the cross connect unit 15 becomes heavy, so detection points for line faults or deterioration of quality of communication are provided at the external line interface units of the transmission apparatus (NE) 1 (see 101 of FIG. 12 or 131, 141 of FIG. 14 (corresponding to 11, 12, and 13 of FIG. 2)). These external line interface parts are available if the transmission apparatus (NE) has a corresponding redundancy configuration such as 1+1 line redundancy, 1:N line redundancy, uni-directional path switched ring (UPSR), two-fiber bi-directional line switched ring (2F BLSR), four-fiber bi-directional line switched ring (4F BLSR), or multiple ring configuration.

The control section of the NE (see 108 of FIG. 12) collects the switching triggers detected at the interface part in accordance with the SONET/SDH or MPLS level. Based on this, the line switch unit (13 of FIG. 13) in the cross connect unit (see 110 of FIG. 13 (15 of FIG. 2)) is controlled.

Next, an explanation will be given of specifically where and how to handle what kind of alarm or information on deterioration of quality of communication in order to realize efficient cooperation between layers while referring to FIG. 12 to FIG. 14.

Further, after this explanation, an explanation will be given of how cooperation between layers can be realized by the network shown in for example FIG. 15, FIG. 16, and FIG. 17. Note that FIG. 15 is a view of a first example of a network (UPSR) to which the present invention is applied, FIGS. 16(*a*) and FIG. 16(*b*) are views of a second example of a network (4F-BLSR) to which the present invention is applied, and FIG. 17 is a view of a third example of a network (mesh network) to which the present invention is applied.

Several good tricks which should be performed at the time of an add operation in order to make the above processing more effective, for example, grouping together paths of the same MPLS label as much as possible for each virtual channel (VC), and the synergistic effect of dual use of multi servicing with ATM or the Ethernet will be explained with reference to FIG. 18 to FIG. 20.

FIG. 18 to FIG. 20 are parts of a view schematically showing the flow of signals between an aggregate side and tributary side straddling the cross connect unit 110 in FIG. 12 to FIG. 14.

Further, an example for expansion of an existing system to apply the present invention will be explained with reference to FIG. 21.

Figure 21:
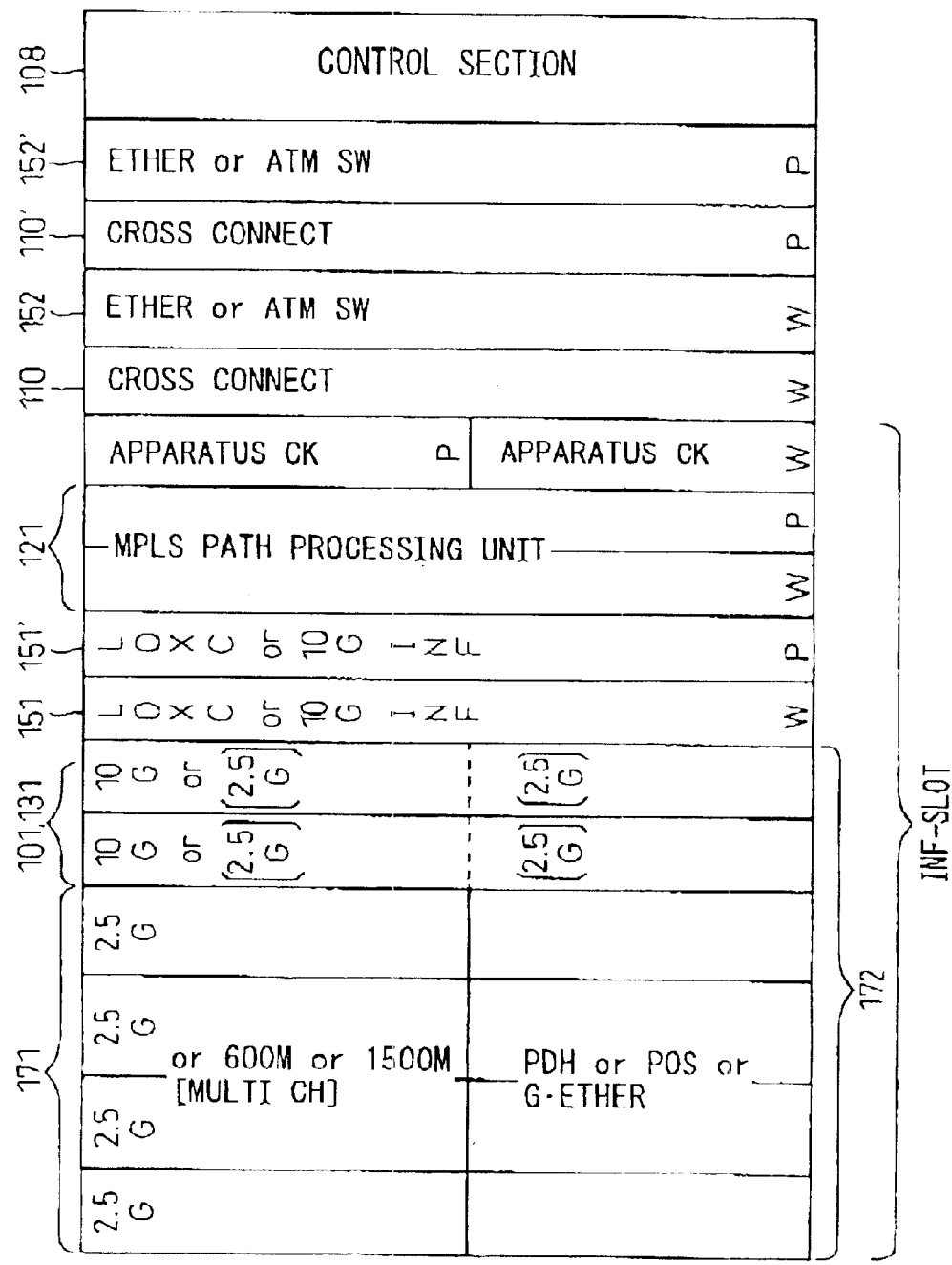
FIG. 21 is a front view of an example of the configuration of a rack in an apparatus to which the present invention is applied.

FIG. 21 is a front view of an example of the configuration of a rack in an apparatus to which the present invention is applied.

Here, FIG. 12 to FIG. 14 will be returned to for a detailed explanation of the apparatus shown in these figures.

The apparatus includes interface units (101, 101', 131, 131', 141, 141', and 141") for communicating signals with the outside. The interface units 101 (101') and 131 (131') are aggregate side interfaces (aggregate side INF's), while the interface unit 141 (141'and 141") is a tributary side interface (tributary side INF). The apparatus is further comprised of a SONET/SDH level cross connect unit 110 (110'), MPLS path processing unit 121 (IP/GMPLS processing unit 16), and control section 108 of the apparatus. In addition, there is a part overseeing the clock synchronization system of the apparatus. It is also possible to support other service menus (ATM, Ethernet, etc.)

In this apparatus, the INF units (101, 131, 141) and SONET/SDE cross connect Unit 110 are connected by signals of a common format such as STS-3, STS-12, or STS-48 (or STS-24). Therefore, as shown in FIG. 21, the slots (INF slots) into which the INF cards are inserted are assigned a plurality of systems' worth of respective ports. It is sufficient for the cross connect side to be able to differentiate and identify the ports of the different slots, so there is almost no restriction by the speed of the external line side of the INF cards. The INF slots can mount universal external line interfaces covering OC-192, OC-48, OC-12, OC-3, PDH (T3, E3, T1, E1), EC1, and other services (in addition, external line interfaces compatible with Ethernet or ATM). For example, if connecting to the basic minimum slots of the INF units (101, 131, 141) four systems of STS-12 signals, it is possible to support OC-48 1CH cards by these basic minimum slots, possible to support OC-12 4CH cards, and, with OC-3, DS3 (=T3) etc., possible to support large numbers of CH (12CH in case of OC-3, and maximum of 48CH in case of DS3 or EC1) so long as mounting allows this. Even with just the above number of ports, if using four times the basic minimum slots, it is also possible to support OC-192 1CH.

Further, even with the same four systems of connections in the apparatus, if it is possible to raise the speed up to STS-24 (corresponding to 1.2G) per system for interfacing in the above minimums slots, it would be possible to support double the mounting density of channels. That is, if OC-48, 2 channels could be supported. Even with OC-192, half of the above, that is, two slots, could be supported. If raising the speed to STS-48 per system, a further double mounting density would become possible. Dote that an example of the signal format in the apparatus is shown in FIG. 3 to FIG. 5.

If using low voltage differential signaling (LVDS) or other transmission technology, even with current technology, it would be easy to raise the interface (backbone interface) speed in the apparatus to 3.6G per system (but two lines forming one system in the case of differential transmission) in terms of serial speed. Therefore, even OC-768 (=40G) interface cards could be similarly mounted at a high density and supported.

In the future, transmission in the apparatus at 5 GHz or over 10 GHz will become possible, so much higher density, compact, low cost apparatuses will become realizable.

In FIG. 12 to FIG. 14, for convenience in explanation, the interface part can be divided into the high speed aggregate side and the low speed tributary side. It is possible to freely cross connect and set the signal system in the apparatus in accordance with the configuration of the network into which the apparatus will be installed and in accordance with the status of the network at that time such as at what kind of speed the external lines of the apparatus can be connected to the high speed side (high speed ring etc.) (for example, OC-192, OC-48, or OC-768), what kind of speed the low speed drop side or the downstream ring is, or whether the OC-48, OC-12, OC-3, EC-1, or PDH. That is, it is not necessary to determine in advance and design in a fixed manner in the apparatus whether to designate a certain speed as the aggregate side or tributary side to designate a certain slot as the aggregate side or tributary side.

Further, the external lines were explained with reference to the example of the SONET signals, but it is also possible to similarly support SDH signals such as STM-64, STM-16, STM-4, STM-1, STM-0, STM-256, etc.

Further, the cross connect units at the SONET/SDH cross connect unit 110 may be various path units such as STS-1, STS-3c, STS-12c, and STS-48c. In recent years, the specifications for the 10 Gbs Ethernet have been becoming finalized. The present invention is useful even when supporting a group of signals of the 10 Gbs units, that is, cross connection in STS-192c units. In this case, if using SDH type expressions, cross connection at the VC-4, VC-4-4, VC-4-16, VC-4-64 units or AU3 level becomes possible.

Even if the speed of the signals in the apparatus is STS-12, STS-24, or at the maximum STS-48 per system, the INF part (101, 103) can also hold an OC-48 or OC-192 (even OC-768) external line interface storing inside it an STS-48c, STS-192c, or other group of signals as an INF card. The reason is that at least four systems of ports are originally provided for each slot to deal with these INF cards, so it is sufficient for the DMUX's in the INF units (101, 131) to convert even large groups of signals of STS-48c or more from serial to parallel formats and drop the signals into the individual systems and for the cross connect unit 110 to convert the signals from the parallel to serial format to restore the original signals.

When the content of the signal interfaced by an INF unit is not more than STS-12c, that is, the group of signals of not more than the signal speed of each system is multiplexed to OC-n and interfaced, it is sufficient to logically link the ports of the systems and the positions of the signals multiplexed and have the part of the circuit converting external line signals to signals in the apparatus inside the INF parts correctly allocate the corresponding signals to the different systems of ports. By doing this, the processing at the cross connect unit 110 is streamlined and the processing at hardware for realizing this cross connect part can be simplified.

Further, the INF unit handles OC-12 or OC-3 or lower signals or PDH signals, so when the total capacity of external lines is less than the total capacity per slot of the signals in the apparatus, the non-used signal ports in the apparatus are made to carry UNEQ-P "no signal" or other signals. By doing this, when cross connecting, it is possible to establish software limitations to prevent cross connection of paths with no UNEQ-P or other signals.

Further, conversely, even if lower speed path level signals, that is, VT1.5, TU3, TU-12, TU-11, or other unit signals, can be cross connected, finer paths cannot be handled. Therefore, it is sufficient to add a cross connect unit operating at the order of such units. In FIG. 12 to FIG. 14, however, details of the cross connect unit of this low speed order will be omitted.

Looking again at FIG. 12 to FIG. 14, the setup for bypassing line faults etc. will be explained giving a specific example of alarm or error detection items mainly along with the typical flow of the primary signals at the drop side shown by bold lines.

The aggregate side INF of FIG. 12 and FIG. 14 may be a UPSR ring such as in FIG. 15 or a 4F (F=fiber) BLSR such as in FIG. 16(a) and FIG. 16(b). Further, even in a mesh network such as in FIG. 17, this is similarly realizable if providing an AIS or RDI setup (explained later) or network management system able to collect or control information from the NE's. Note that the operations in the network examples (FIG. 15 to FIG. 17) will be explained later, but the state of the aggregate side INF's of FIG. 12 and FIG. 14 receiving and sending east (clockwise) optical signals and west (counterclockwise) optical signals is drawn Note that at the time of a 4F (F=fiber) BLSR (FIG. 16), it is possible to receive and send signals by another system using a different channel of the existing INF card or a different INF card. At this time, the aggregate side INF of FIG. 12 and FIG. 14 is deemed as being connected to the working (W) side and protection (P) side of the span SW (=redundancy resembling 1+1 redundancy) in the line in the working side direction when the east is made the working line and the west the protection line. Note that the INF unit of the protection line in the counterclockwise direction of the ring (FIG. 16) may be considered to be hidden at the back. Further, if focusing on one node (NE) in the mesh network of FIG. 17, it may be considered that another INF unit is connected to another node in the plurality of nodes connected in it or, if a dual or more multiple ring is connected, consider that that plurality worth of interfaces are separately provided. In FIG. 13, the SONET/SDH cross connect unit appears to be duplexed as shown by the reference numerals 110 and 110' because the same action is given to two cross connect cards mounting the cross connect units 110 and 110' to give card redundancy to prevent communication from being broken off instantaneously even if one of the cross connect cards breaks down. With this card redundancy setup, the breakdown rate of the apparatus becomes much lower and the reliability of the apparatus is improved.

Due to this redundancy configuration, two signal lines (a, b and c, d) are drawn from the cross connect units (110, 110')

to the INF units (110, 101' and 131, 131'). The provision of the selectors (105, 135) in the INF units shows this cross connect card redundancy. Therefore, automatic card redundancy can be realized by selecting the better quality INF unit.

On the other hand, the MPLS path processing unit (121, 121') also appears to be duplexed because similar card redundancy is employed here too. This raises the reliability. Illustration of the card redundancy signal lines at the portion where signals are transferred between the SONET/SDH cross connect units and MPLS path processing units is however omitted since it would be troublesome.

Note that the cooperation between the two cards for this card redundancy and the cooperation between both SONET/SDH line switching and path switching and MPLS path switching are completely separate in level. Here, the cooperation of the latter, which forms the point of the present invention, will be explained below taking as an example the flow of signals (shown by thick lines) in the apparatus of FIG. 12 to FIG. 14.

To simplify the explanation, as shown in FIG. 15, the UPSR is made a 1+1 line redundancy configuration. The case where an aggregate side signal (AGG) arriving from upstream is dropped downstream linked to the tributary (TRB) side will be considered here.

The path forming the line or UPSR at the SONET/SDH layer becomes the route as shown by the line of the path in FIG. 15 (e, f, g. h). The virtual path of the MPLS level may also be said to match with the above path. In this case, if switching lines or switching UPSR paths of the SONET/SDH layer to bypass the line fault (X), the MPLS virtual path is also automatically restored from the line fault. By this setup, the load involved in switching MPLS paths is reduced.

However, the SONET/SDH layer path and the MPLS virtual path do not always match. This is because with an MPLS virtual path, it is sometimes possible to lay a mesh in the SONET/SDH ring. Further, when there is an MPLS path added to the BONET/SDH ring, it is necessary to consider the virtual path further back upstream at the MPLS layer.

Therefore, when trying to manage the network for the MPLS virtual paths, the MPLS path processing unit 121 shown in FIG. 13 becomes necessary.

The traffic flowing through the SONET/SDH ring is not necessarily all IP's, but a path including the MPLS at the higher layer among the SONET/SDH paths is dropped from the SONET/SDH cross connect processing unit 110 to the MPLS path processing unit 121. At this time, it is not necessarily required that all of the SONET/SDH paths including the MPLS at the higher layer be dropped. The reason is that path control of the lower layer ends up being sufficient for the part where the MPLS path and SONET/SDH path completely match. This being so, the load on the MPLS path processing unit 121 becomes remarkably lighter. Therefore, the trick of adding the MPLS path to the SONET/SDH network is shown in FIG. 18 to FIG. 20.

In FIG. 13, the MPLS processing unit 121 is provided with the function of having mainly the label switch 124 in the label switch unit 126 comprised of the control label processing unit 123, the label switch (routing) 124 and the label path switch 125 route the packets based on their labels and, after routing, output the results to the ports of the corresponding SONET/SDH paths, and then return the results to the SONET/SDH cross connect unit 110. Note that the SONET/SDH cross connect unit 110 again cross connects the packets returned from the MPLS path processing unit 121 toward the INF slots corresponding to the SONET/SDH paths leading to the desired destination (see INF-Slot in FIG. 21). The destination interfaces are of course not limited to SONET/SDH interfaces. For example, if providing in the above-mentioned INF units (101, 131) suitable setups for converting to PDH, the Ethernet, or ARM, PDH, Ethernet, ATM, or other interfaces are also possible.

In FIG. 13, the MPLS path processing unit 121 is provided with the already explained label path switch (label PSW) 125 relating to the explanation of the core part given later in addition to the label routing switch (124). Note that the core part, that is, restoration of the SONET/SDH paths and restoration of the MPLS paths, will be explained later.

In FIG. 13, the MPLS path processing unit 121 also has a database 127 for storing a routing table for label routing etc. This database 127 may also store database information required for GMPLS processing in addition to simple routing tables. The database relating to network topology, however, may also be provided at the already explained network management system.

In addition, the MPLS path processing unit 121 can be provided with the functions of monitoring and adjusting the flow of packets transferred with MPLS labels. This corresponds to the flow amount monitoring/adjusting unit 128. In this case as well, if the switch capacity and capability of the label switch 124 are sufficient for handling the maximum number of ports when packets are input from the SONET/SDH cross connect unit 110 to the MPLS path processing unit 121, this flow amount monitoring/adjusting unit 128 is unnecessary. Therefore, in this case, for the purpose of lowering the cost of the label switch 124, it is possible to design the switch capacity and capability to be up to a certain level considering the statistically multiplexing effect of the MPLS. At this time, if the flow exceeds the allowable level, it is sufficient to discard packets from those of lower priority and to inform the upstream side nor to transfer any further packets through these paths using control labels etc.

There is also a concern that the flow will fluctuate over time and that the flow might exceed the allowable level temporarily (or instantaneously). In view of this situation, it is possible to provide a buffer at the input part of the MPLS path processing unit 121 so as to average out the flow to smooth it out over time. This is the so-called "shaping function". If giving this flow monitoring/adjusting function, it is possible to reduce the MPLS label switch capacity and lower the cost.

Before ending the above explanation once, mention will be made of some tricks that can be applied to the interface between the SONET/SDH cross connect unit 110 and MPLS path processing unit 121 and port arrangement.

The interface in the apparatus between the two parts (110, 121) uses the same format as the format used when connecting between the cross connect unit 110 and the INF units (101, 131). For example, if the connections in the apparatus are connections comprised of a plurality of systems worth of STS-12, the communication capacity between the two becomes (STS-12)×(number of connection CH), while if connections in units of STS-24 or STS-48, it becomes that (speed)×(number of connection CH) For example, if the basic minimum slots of the INF card explained above have four systems worth of connections with STS-48, by inserting one card of the MPLS path processing unit 121 for two slots worth of INF cards, it is possible to get that one card to handle the 40 Gbs worth of MPLS path processing. If trying to further raise the MPLS path processing capacity, it is sufficient to raise the speed per unit CH.

In this way, if seen from just the physical connections, for the cross connect unit 110, the INF units (101, 131) and the MPLS path processing unit 121 can be said to be equivalent. This is the key enabling effective utilization of resources when adding the MPLS path processing unit 121 to a conventional SONET/SDH apparatus.

Ordinarily, this is not limited to the MPLS processing unit 121. It is also possible to similarly use the INF slots of FIG. 21 to execute processing at the cross connect unit for performing finer operation at the low speed order of the VT level or TU level, ATM switch unit, of Ethernet switch processing unit, VT1.5↔TU-12 conversion, or AU-3, AU-4↔VC-3 conversion and other such SONET-SDH conversion.

Therefore, the arrangement of the ports for interfacing between the cross connect unit 110 and the MPLS path processing unit 121 will be studied. As explained above, there is a setup forming a signal flow in which the cross connect unit 110 transfers a cross connected signal to the MPLS path processing unit 121, the label switch 124 routes that signal, then sends that signal again through the XC cross connect unit 110 to the INF's (101, 131). There is physically no restriction at all on the arrangement of the signals to be allocated to the ports connecting the MPLS path processing unit 121 and the cross connect unit 110. For example, the order when laying the paths may be made the order starting from the latest port number. Such simple processing is sufficient. The reason is as follows.

First, since it is in any case not possible to input signals of more than the number of ports present at the input part of the MPLS unit (or signals of more than the processing capability of the MPLS unit) when inputting signals from the cross connect unit (XC unit) 110 to the MPLS path processing unit (MPLS unit) 121, it is possible to make the above ports physically fixed ports when inputting signals. By doing this, providing extraneous input selectors in the MPLS unit and processing for allocating signals to the input ports of the switch become unnecessary. However, since the intent is to perform processing for bypassing a line fault in a path independently even at the MPLS virtual path layer, redundant paths such as shown in FIG. 13 are left redundant and the signals are input to the MPLS unit 121. Further, since the paths are switched based on independent detection conditions at the MPLS unit, the redundant amount of input ports are necessary.

Desirably, after routing at the MPLS unit (MPLS path processing unit) 121, the better quality path is selected from the path redundancy configuration, then the apparatus places the MPLS packets on the lower layer such as the SONET/SDH and allocates destinations for output. However, after a signal is output from the MPLS unit (121), that signal is always sent to the XC unit (SONET/SDH cross connect unit 110) and then sent to the INF unit (101, 131) leading to the corresponding output destination, So the above desired operation can be achieved if the physical signal lines at the output port of the MPLS unit are linked in the order of the output port numbers of the routing table (or output part of SW switch) without any regard as to the INF unit of the destination. In other words, in the present apparatus, it is sufficient that the destination after routing of the path and the place where the INF unit is linked to match, so it is sufficient to control the system by software so that the two (110, 121) are linked and cross connected at the cross connection operation of the XC unit of the signal after being output from the MPLS. Therefore, the management system of the apparatus need only automatically perform by software processing for cross connection at the XC unit after passing through the MPLS unit after the operator designates the channel or path of the INF unit of the destination of the path after routing. Provision of such a setup is very convenient for operation of the apparatus and requires only the above extent of simple processing, so not that complicated software is required.

Further, the setup for cooperation between restoration of SONET/SDH paths and restoration of MPLS paths in FIG. 12 to FIG. 14 will be explained below.

First, the transmission apparatus (NE) 1 at the SONET/SDH layer must be set up as follows for processing as in the past.

When the NE receives a LOS or LOF signal at the line from the upstream side, the NE has to send an alarm indication signal-line (AIS-L) to the downstream line (see AIS, LOS of FIG. 15). Further, when detecting an LOS, LOF, or AIS-L (depending on the setting, also a TIM-L "destination error") at the line from the upstream side, the NE sends an alarm indication signal-path (AIS-P) to the downstream path (when sending to the PDH, sends AIS of PDH). At the same time, it has to send a remote defect indicator-line (RDI-L) to the upstream line sending side (see RDI of FIG. 17). Further, when the NE receives any of the LOP-P, AIS-P, or UNEQ-P (depending on the setting, also TIM-P, PLM-P) at the path from upstream, the NE has to send the AIS-P to the downstream path (AIS of PDH when sending PDH) and return a remote defect indicator-path (RDI-P) to the upstream path. Further, it has a performance monitoring function unit (see blocks 103, 106 of FIG. 12) for detecting B1 error or B2 error on the line serving as the source of information for measuring the line deterioration information (error rate) and thereby detecting the error rate of the received signal. When receiving this B2 error, it writes into predetermined bits of the M1 byte the number of the error bits and returns the result to the sending side (106 of FIG. 12). By this, the upstream side NE can automatically recognize that some sort of error has occurred in the line which that NE (transmission apparatus 1) sent the signal over by viewing the M1 byte of the signal returned from the downstream NE. Further, the NE can recognize that no error (signal deterioration) has occurred in the path of the signal received by detecting the B3 byte.

Further, the NE simultaneously writes into predetermined bits of the G1 byte the number of bits of the error shown in the detected B3 byte and returns the result to the upstream sending side NE. By this, the upstream side NE can recognize that some sort of error has occurred in the destination path. To give it this setup, the SONET/SDH interface 101 has a detector 103 for detecting LOS, LOF, AIS-L, TIM-L, B1 error, B2 error, and M1 bytes (=B2 error of PEND) in addition to the O/E-E/O conversion units 102, 107.

Further, it has a transmission unit 106b having the function of sending to the sending line an AIS-L to the downstream side in accordance with a request from the management system of the NE when the receiving unit of the NE detects an LOS or LOF from the upstream side. Further, it has an adding unit 106a for adding the RDI-L to the sending line automatically when detecting an LOS, LOF, or AIS-L (depending on the setting, also TIM-L) on the receiving line (however, when an AIS-L transmission command arrives, transmission of the AIS-L is given priority over the RDI-L). Further, the AIS-P is added to the signal to the cross connect unit 110 (AIS-P adding unit 112 of FIG. 13).

On the other hand, it has the function of automatically adding the number of error bits to a predetermined position of the M1 byte when detecting a B2 error at the received line (106a of FIG. 12). In addition, this is set up to establish synchronization between NE's of the network through the line by receiving and sending the S1 byte, but the explanation will be omitted here.

Further, the SONET/SDH cross connect unit 110 of FIG. 13 has the function of cross connecting the STS-1 and STS-Nc level paths (in case of SDH, corresponding to VC-3, VC-4, or VC-4—4-Nc), so the cross connect unit has a detector 114a for detecting LOP-P, AIS-P, UNEQ-P, TIM-P, PLM-P, and B3 error. Further, there is a resending unit 114b having the function of sending back an RDI-P when such an LOP-P, AIS-P, or other path alarm is issued and writing, at the predetermined positions (REI bits) of the G1 byte of POH, the number of bit errors of the B3 byte and sending it back when receiving the number of error bits showing the B3 byte. Note that if the NE has a cross connect function of a level of the lower speed VT1.5 or TU-12, it is necessary to give the function of sending back an RDI-V when detecting an alarm of the path level of VT (TU) or detecting path error of the path level and sending back the fact that path error has been detected by the REI bits. Further, when providing a PDH interface unit, sometimes the cross connect unit may cross connect only at high speed paths, and a path to be terminated at the FDH interface unit may be sent to the PDH INF unit through the same. For this, for a signal sent from the interface unit to the outside of the NE, it is necessary to give the function of detecting path alarm and returning an RDI in the opposite direction, changing the PDH signal of the sending side to an AIS, or detecting path error and returning an REI in the opposite direction, before terminating the path.

Note that when supporting the above low speed path, by properly adding an MPLS path as shown in FIG. 18 to FIG. 20, it is possible to make effective use of the support functions of this low speed path and reduce the load of the MPLS path processing unit 121 as well.

Explaining this in more detail, the flow of processing will be explained along the flow of the signals input at the aggregate side INF (101) of FIG. 12. The received signal of a line is converted from an optical to an electrical signal at the O/E conversion unit 107, then various alarms or error are detected by the detector 103 and the control explained above is executed. Note that when the external line is not for an optical, but electrical signal, instead of the above O/E conversion unit 107, use is made of an LIU receiver unit for converting a bipolar signal to a unipolar signal.

The aggregate side INF (101) has a synchronization unit 104 for replacing the clock of the signal received from an external line with the clock CK synchronized with in the apparatus (NE). Securing synchronization in the apparatus (NE) makes control of the cross connect unit 110 and the MPLS path processing unit 121 easier and therefore can lighten the load of processing on the hardware.

There are several aggregate side INF's in the apparatus. These connect with not just one ring, but a plurality of rings or local networks. Therefore, sometimes the reference clock CK of the network synchronization will differ for each ring or local network and sometimes complete mutual synchronization will not be possible outside of the synchronization units (CK replacing unit) 104 of the aggregate side INF's and mutually different clocks CK will be used. Therefore, this CK replacing function is given to all aggregate side INF's. Such CK replacing units not only provide functions able to withstand the differences in clocks CK between different local networks, but also have the effects of absorbing jitter or wandering inherent to networks and thereby eliminating fluctuations in signal speeds.

Around the CK interchanging units (104), it is possible to replace the section overhead SOH of the received frames, terminate the SOH of the external line once, and change the received signal to the signal format in the apparatus. At this time, naturally the pointer is also replaced, So it is possible to detect the LOP-P or AIS-P of the external line signal at this time. Note that the transmission side pointer of the signal sent inside the apparatus after detection of the LOP-P is designated as AIS-P.

Further, when the external line carries an OC-48 or OC-192 or other signal and the apparatus handles an STS-12, STS-24, (STS-48), or other signal, a demultiplex (DUX) function is given. Conversely, when the external line side is provided with for example an OC-3 4CH interface, a multiplex (MUX) function to the STS-12 etc. is given.

Still further, as explained above, the transmission direction selector (SEL) 105 is for handling card redundancy of the cross connect units 110 and 110'. while not shown in FIG. 12 to FIG. 14, when sending the received signal of the external line side of the aggregate side INF to the cross connect unit 110, the same signal is sent to the two cross connect units 110, 110' to give this card redundancy. Naturally, that number of ports is also provided. Since the illustration would become complicated, illustration in FIG. 12 to FIG. 14 is omitted. The same can be said for the interface part of the cross connect cards (110) and MPLS cards (121).

Further, from the viewpoint of physical interconnection and arrangement of slots, the same may be achieved even if replacing the MPLS unit (121) with an INF unit (101). When desiring to give this MPLS unit card redundancy (121, 121'), the INF unit (101) is given 1:N card redundancy configuration. The INF unit is originally connected to an unused port of the cross connect unit, so when triggered by a card failure, it is sufficient to switch the working signal for processing the same signal connected to another port.

In FIG. 13, the MPLS path processing unit 121 has a POS function (POS INF 122) and can remove the SONET/SDH frame. In this case, when the MPLS virtual path is the same as the SONET/SDH path, labeling processing (control label processing unit 123) is not necessary, so the load of the label switch unit 126 can be reduced The processing at this label switch unit may be processing as in MPLS based on a shim header as discussed at the IFTE.

Adding some further comment to the above, in the same way as the case of linking G-Ether, 10G-Ether, etc. and SONET/SDH POS, efficient processing is possible based on the present invention. Similar merits are obtained even in EoMPLS combining the Ethernet and MPLS.

Further, if using the present invention, it is possible to realize a network where the MPLS layer and photonic layer directly cooperate even with simple, low cost apparatuses without SONET/SDH layers.

In the present invention, the electrical signal processing requiring a memory, for example, detailed MPLS processing, is performed at the electrical processing unit (electrical signal transmission section 4) converting the optical signals to electrical signals, while portions advantageously processed in the optical signal state such as wavelength ($\lambda$) routing are performed as is in the optical signal state. In this optical processing unit (optical signal transmission section 2), the majority of the processing at the lower layer such as fault bypassing at the optical level based on an alarm which is detectable at the optical signal level, is left to the optical signal level. On the other hand, more detailed control or detailed path (higher path) control is performed at the electrical processing unit (electrical signal transmission section 4).

Still further, according to the present invention, when cooperating with the SONET/SDH layer, all of the electrical processing is not left to the MPLS path processing unit (LSR) 121. The SONET/SDH layer assigns functions to the layer between the light and MPLS for processing. Due to this, it is possible to realize an efficient transmission apparatus not overly burdened with processing. Similar merits arise in an EoMPLS combining G-Ether, 10G-Ether, or other Ether and MPLS.

Finally, portions still not explained in FIG. 12 to FIG. 21 will be briefly explained supplementarily.

In FIG. 13, reference numeral 111 is a detector for activating the AIS-P adding unit 112 when detecting an LOS or LOF in the input primary signals.

In FIG. 12, SF is issued at the time of a major alarm state such as an LOS or LOF, while SD is issued at the time of a minor alarm state such as an MIN (minor)These SF and SD are input to the control section 108. This control section 108 has a CPU 109, generates a BLSR or other trigger, and supplies it to the line switch (SW) 113 of FIG. 13. The control section 108 is given various information I from the outside in addition to SF and SD.

In FIG. 13, reference numeral 111 is a detector for activating the AIS-P adding unit 112 when detecting an LOS or LOF in the input primary signals. The signal passing through the adding unit 112 is input to the line switch (SW) unit 113. Here, the BLSR performs line switching. This includes a path switch (PSW) and time slot interchanger (TSI) 115. The PSW performs switching at the path level (path overhead), while the TSI performs cross connection at the further finer level. An alarm is detected at the path level by the above-mentioned detector 114. The LOP-P, AIS-P, etc. shown in it are known from standards. When this detector 114 detects an alarm of the path level, it uses this as the trigger for switching to the line switch 113.

Further, in FIG. 13, the cross connect unit 110 includes two systems of lines, that is, the west side and the east side, so there are the functional parts 117, 118, and 116 (for the second system) similar to the above-mentioned functional parts 111, 112, and 114 (for the first system).

Referring to FIG. 14, due to the presence of the two systems of lines, there is another external line interface unit 131 (131') similar to the external line interface unit 101 (101') shown in FIG. 12. The components 132 to 137 in the external line interface unit 131 (131') are completely the same as the components 102 to 107 of FIG. 12.

In FIG. 14, the selector (SEL) 142 selects the normal one of the two cross connect units 110 and 110' of the redundancy configuration.

In FIG. 15, when a line disconnection fault occurs between the NEi and NEj including transmission apparatuses 1, the NEj (and NEi) send out an AIS triggered by the LOS. Receiving this AIS, by adopting the configuration shown in FIG. 2, the NEk can disperse the load for measures against this fault by the SONET/SDH cross connect unit 110 of FIG. 13 even at the SONET/SDH layer.

In FIG. 16(a) and FIG. 16(b), when the network changes from the normal state of (a) to the abnormal state of (b), in the network, the BLSR and the path switch (PSW) operate completely independently. The present invention can be applied to this network as well. Note that the hatched parts in the figure show the protection side, while the non-hatched parts show the working side.

In FIG. 17, when a fault (X) occurs inside a network of a mesh configuration, the NEm sends an AIS to the downstream side NE and sends an RDI to the upstream side NEO. Receiving the RDI, the NEo subsequently allocates signals arriving from the line p to the line g and the line r. The load for the processing required for this allocation process is distributed at the SONET/SDH layer side at the NEo using the present invention.

FIG. 18 to FIG. 20 show the flow of signals between the aggregate side INF's (101, 131) and tributary side INF's (141, 141', 141") in FIG. 12 to FIG. 14. The transmission apparatus 1 of the present invention is a hybrid transmission apparatus and can realize high order cross connect, low order cross connect, ATM, PDH, Ethernet, SONET/SDH, or other multi services. This is shown simply in the figure.

FIG. 18 corresponds to the aggregate side INF (101, 131, etc.) in FIG. 12 to FIG. 14, FIG. 19 corresponds to the cross connect unit 110 in FIG. 12 to FIG. 14, and FIG. 20 corresponds to the tributary side INF (141, 141', 142", etc.) in FIG. 12 to FIG. 14. By tracing back the flow of signals in FIG. 12 to FIG. 14, the result becomes as shown in FIG. 18 to FIG. 20.

FIG. 19 shows an overall U-shaped ring switch unit 113 and an MPLS path processing unit 121, low order cross connect unit 151, and ATM switch (SW) unit or Ethernet protection processing unit 152 cooperating with this line switch unit 113. The line switch unit 113 functions as a high order cross connect unit.

Further, FIG. 20 shows a PDH interface unit 161, an Ethernet interface unit 162, a POS interface unit 163, and an ATM/Ethernet-over-SONET/SDH interface unit 164.

In FIG. 21, components corresponding to those shown in FIGS. 12, 13, 14, and 19 are shown assigned the same reference numerals. Further, reference numeral 171 shows a 2.5 Gb or other multichannel card, while 172 shows a PDH, POS or gigabit Ethernet card. Note that in the figure, W is an abbreviation for "working" and P for "protection".

Summarizing the above, the present invention realizes transmission apparatuses of the following (i) to (iii):

(i) A SONET/SDH transmission apparatus or ADM/cross connect apparatus enabling IP traffic engineering of an overall network including determination of the connections not only between one router and another as in the past, but also between one transmission apparatus and another, by dealing with processing of GMPLS (MPλS) functions expanded from conventional MPLS functions, defined by the IETF, inside the transmission apparatus.

(ii) A photonic transmission apparatus or WDM, OADM, or OXC apparatus enabling IF traffic engineering of an overall photonic network, by dealing with processing of GMPLS (MPλS) functions etc.

(iii) A transmission apparatus compatible with GMPLS (MPλS) functions etc., having functions of both SONET/SDH transmission apparatus (ADM/cross connect apparatus) and photonic transmission apparatus (WDM, OADM (/OXC)) in the same apparatus, and enabling traffic engineering of an IP transmission network (IP transmission optical network) of all different types of configurations such as IP-over-WDM, IP-over-SONET/SDH, and IP-over-SONET/SDH-over-WDM.

As explained above, according to the present intention, it is possible to process the previously separately managed SONET/SDH/WDM layer and TCP/IP layer by the same transmission apparatus and therefore integrally manage the entire network. Due to this, it is possible to drastically cut the hardware costs and running costs of an optical network for transmitting IP signals.

While the invention has been described with reference to specific embodiments chosen for purpose of illustration, it should be apparent that numerous modifications could be made thereto by those skilled in the art without departing from the basic concept and scope of the invention.

What is claimed is:

1. A transmission apparatus for coupling an optical signal transmission section and an electrical signal transmission section through an opto-electric two-way conversion unit, wherein:
the electrical signal transmission section is comprised of a SONET/SDH signal processing function unit and a generalized multi protocol label switching (GMPLS) function processing function unit which cooperates with that function unit.

2. A transmission apparatus as set forth in claim 1, wherein said SONET/SDH signal processing function unit includes a cross connect unit, which cross connect unit extracts from the SONET/SDH signal a GMPLS compatible signal compatible with the GMPLS and cooperates with the GMPLS function processing function unit.

3. A transmission apparatus as set forth in claim 2, wherein said cross connect unit is connected to various external line interface units for interfacing with external SONET/SDH signals, PDH signals, ATM signals, Ethernet signals, etc.

4. A transmission apparatus as set forth in claim 2, wherein said GMPLS function processing function unit includes a label switch.

5. A transmission apparatus as set forth in claim 1, wherein said optical signal transmission section has on one hand an optical add/drop function unit for transferring an optical signal with said electrical signal transmission section through said opto-electric two-way conversion unit and on the other hand has an optical cross connect function unit for switching paths in wavelength units of the optical signal with said electrical signal transmission section through said opto-electric two-way conversion unit.

6. A transmission apparatus as set forth in claim 5, wherein:
said optical add/drop function unit includes a first optical interface, said first optical interface being a first wavelength conversion unit for transferring an optical signal with said opto-electric two-way conversion unit at a particular wavelength, and
said optical cross connect function unit includes a second optical interface, said second optical interface being a second wavelength conversion unit for transferring an optical signal with said opto-electric two-way conversion unit at a particular wavelength.

7. A transmission apparatus as set forth in claim 5, wherein said optical add/drop function unit includes a third optical interface, said third optical interface being a third wavelength conversion unit for transferring an optical signal with an external SONET/SDH network at a particular wavelength.

8. A transmission apparatus as set forth in claim 5, wherein said optical cross connect function unit is connected with an external WDM network through said optical add/drop function unit.

9. A transmission apparatus as set forth in claim 1, wherein said GMPLS function processing function unit is provided with an FB-ATM processing unit for processing FB-ATM cells.

10. A transmission apparatus as set forth in claim 9, wherein said FB-ATM processing unit is comprised of an expanded ATM cell and/or variable length ATM cell processing function unit.

* * * * *